United States Patent
Kwon

(10) Patent No.: US 10,721,611 B2
(45) Date of Patent: Jul. 21, 2020

(54) METHOD AND DEVICE FOR CONTROLLING DEVICE BY USING BLUETOOTH TECHNOLOGY

(71) Applicant: LG ELECTRONICS INC., Seoul (KR)

(72) Inventor: Younghwan Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/475,598

(22) PCT Filed: Jan. 2, 2018

(86) PCT No.: PCT/KR2018/000058
§ 371 (c)(1),
(2) Date: Jul. 2, 2019

(87) PCT Pub. No.: WO2018/124852
PCT Pub. Date: Jul. 5, 2018

(65) Prior Publication Data
US 2019/0327601 A1 Oct. 24, 2019

Related U.S. Application Data

(60) Provisional application No. 62/441,555, filed on Jan. 2, 2017, provisional application No. 62/457,741, filed on Feb. 10, 2017.

(51) Int. Cl.
*H04W 76/14* (2018.01)
*H04W 76/10* (2018.01)
*H04W 48/16* (2009.01)
*H04W 8/00* (2009.01)
*H04W 4/80* (2018.01)
(Continued)

(52) U.S. Cl.
CPC ............ *H04W 8/005* (2013.01); *H04W 4/80* (2018.02); *H04W 8/24* (2013.01); *H04W 28/0215* (2013.01); *H04W 76/14* (2018.02); *H04W 92/18* (2013.01)

(58) Field of Classification Search
CPC ....... H04W 48/16; H04W 4/00; H04W 76/10; H04W 76/14; H04W 52/0209; H04W 8/005
See application file for complete search history.

(56) References Cited

U.S. PATENT DOCUMENTS 10,349,253 B2* 7/2019 Kim .................. H04W 52/0209
10,375,710 B2* 8/2019 Choi ..................... H04W 8/005
(Continued)

FOREIGN PATENT DOCUMENTS

KR 10-2016-0115048 A 10/2016
WO WO 2015/194854 A1 10/2015

*Primary Examiner* — William D Cumming
(74) *Attorney, Agent, or Firm* — Birch, Stewart, Kolasch & Birch, LLP

(57) ABSTRACT

A method and apparatus to search for a service in a wireless communication system. According to an embodiment, after a first device is connected with a second device, the first device can recognize a service provided by the second device or a characteristic value associated with the service through a message received from the second device. In addition, when the service or characteristic value is changed, the first device can receive a message informing of this from the second device.

14 Claims, 43 Drawing Sheets

(51) Int. Cl.
*H04W 8/24* (2009.01)
*H04W 28/02* (2009.01)
*H04W 92/18* (2009.01)

(56) References Cited

U.S. PATENT DOCUMENTS

| | | |
|---|---|---|
| 2013/0029596 A1 | 1/2013 | Preston et al. |
| 2014/0052862 A1 | 2/2014 | McGuire et al. |
| 2015/0304843 A1 | 10/2015 | Hillyard |
| 2017/0325161 A1* | 11/2017 | Kwon .................. H04W 76/10 |
| 2018/0098338 A1* | 4/2018 | Choi ...................... H04L 29/08 |
| 2018/0249310 A1* | 8/2018 | Kim ...................... H04W 48/16 |
| 2019/0327601 A1* | 10/2019 | Kwon .................. H04W 76/14 |

\* cited by examiner

Fig.10

| Service Type (1 byte) | Primary Service UUID (Variable - 2bytes, 4bytes, 16bytes) | Security Requirements (1 byte) |
|---|---|---|

Fig.15

| Field Name | Client List Information | Num Of 16bit UUID List | 16bit UUID List | Num Of 32bit UUID List | 32bit UUID List | Num Of 128bit UUID List | 128bit UUID List |
|---|---|---|---|---|---|---|---|
| Data Type | 1byte | 1byte | 16 bits * num of 16 bit UUID List | 1byte | 32 bits * num of 32 bit UUID List | 1byte | 128 bits * num of 128 bit UUID List |

Client List Characteristic

Fig.16

| Field Name | Num Of 16bit UUID List | 16bit UUID List |
|---|---|---|
| Data Type | 1byte | 16 bits * num of 16 bit UUID List |

(a) Client List Characteristic

| Field Name | Num Of 32bit UUID List | 32bit UUID List |
|---|---|---|
| Data Type | 1byte | 32 bits * num of 32 bit UUID List |

(b) Client List Characteristic

| Field Name | Num Of 128bit UUID List | 128bit UUID List |
|---|---|---|
| Data Type | 1byte | 128 bits * num of 128 bit UUID List |

(c) Client List Characteristic

Fig.17

| 7th bit ~ 3rd bit | 2nd bit | 1st bit | 0th bit |
|---|---|---|---|
| Reserved For Future Use | 128bit UUID List | 32bit UUID List | 16bit UUID List |

(a) Client List Information 1

| 7th bit | 6th bit | 5th bit | 4th bit | 3rd bit | 2nd bit | 1st bit | 0th bit |
|---|---|---|---|---|---|---|---|
| Reserved For Future Use | Uncompleted 32bit List | Uncompleted 16bit List | Reserved For Future Use | Reserved For Future Use | 128bit UUID List | 32bit UUID List | 16bit UUID List |

(b) Client List Information 2

| 7th bit | 6th bit | 5th bit | 4th bit | 3rd bit | 2nd bit | 1st bit | 0th bit |
|---|---|---|---|---|---|---|---|
| Reserved For Future Use | Reserved For Future Use | Uncompleted 16bit List | Reserved For Future Use | Reserved For Future Use | 128bit UUID List | 32bit UUID List | 16bit UUID List |

(c) Client List Information 3

Fig.18

| Field Name | Client List Information | Num Of 16bit UUID List | 16bit UUID List | Num Of 32bit UUID List | 32bit UUID List | Num Of 128bit UUID List | 128bit UUID List |
|---|---|---|---|---|---|---|---|
| Data Type | 1byte | 1byte | 16 bits * num of 16 bit UUID List | 1byte | 32 bits * num of 32 bit UUID List | 1byte | 128 bits * num of 128 bit UUID List |

(a) Server List Characteristic

| 7th bit ~ 3rd bit | 2nd bit | 1st bit | 0th bit |
|---|---|---|---|
| Reserved For Future Use | 128bit UUID List | 32bit UUID List | 16bit UUID List |

(b) Server List Information

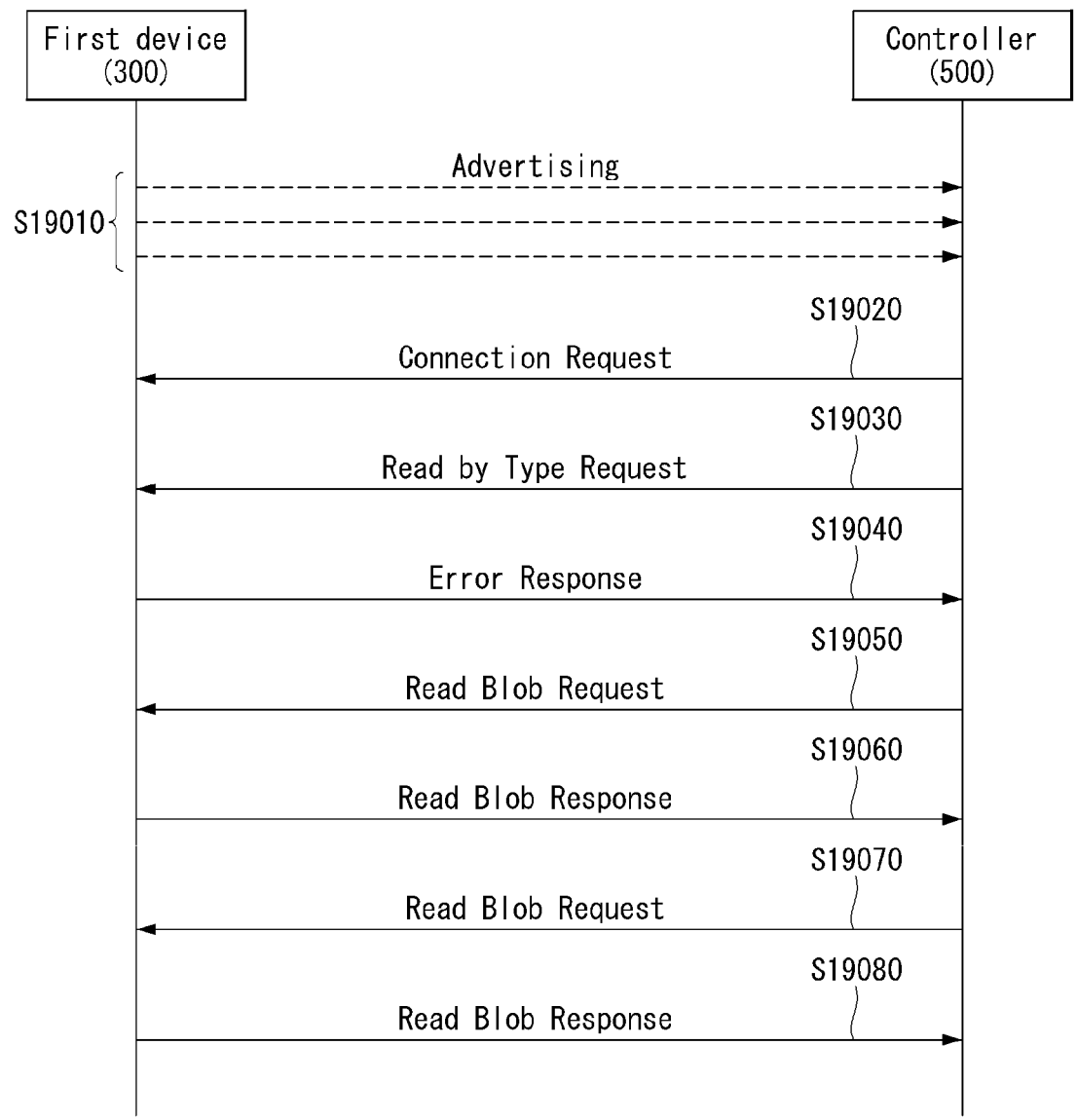

Fig.20

| Field Name | # of Primary Service | Length of Primary Service | Primary Service1 Type | Primary Service UUID | Start Handle of Primary Service | End Handle of Primary Service |
|---|---|---|---|---|---|---|
| Data Type | 1byte | 1byte | 1byte | Variable | 2bytes | 2bytes |

| Length of Included Service | Included Service Type | Included Service UUID | Start Handle of Included Service | End Handle of Included Service |
|---|---|---|---|---|
| 1byte | 1byte | Variable | 2bytes | 2bytes |

(a) Structure Information Characteristic

| 7th bit | 6th bit | 5th bit ~ 2nd bit | 1st bit | 0th bit |
|---|---|---|---|---|
| Service1 Type | Changed | Reserved For Future Use | UUID List | |

(b) Service Type

Fig.21

| Field Name | # of Primary Service | Length of Primary Service 1 | Primary Service1 Type | Primary Service1 UUID | Start Handle of Primary Service1 |
|---|---|---|---|---|---|
| Data Type | 1byte | 1byte | 1byte | Variable | 2bytes |

| End Handle of Primary Service1 | Length of Included Service1 | Included Service1 Type | Included Service1 UUID | Start Handle of Included Service1 | End Handle of Included Service1 |
|---|---|---|---|---|---|
| 2bytes | 1byte | 1byte | Variable | 2bytes | 2bytes |

| Length of Primary Service 2 | Primary Service 2 Type | Primary Service 2 UUID | Start Handle of Primary Service 2 | End Handle of Primary Service 2 |
|---|---|---|---|---|
| 1byte | 1byte | Variable | 2bytes | 2bytes |

| Length of Included Service 1 | Included Service 1 Type | Included Service 1 UUID | Start Handle of Included Service 1 | End Handle of Included Service 1 |
|---|---|---|---|---|
| 1byte | 1byte | Variable | 2bytes | 2bytes |

Structure Information Characteristic

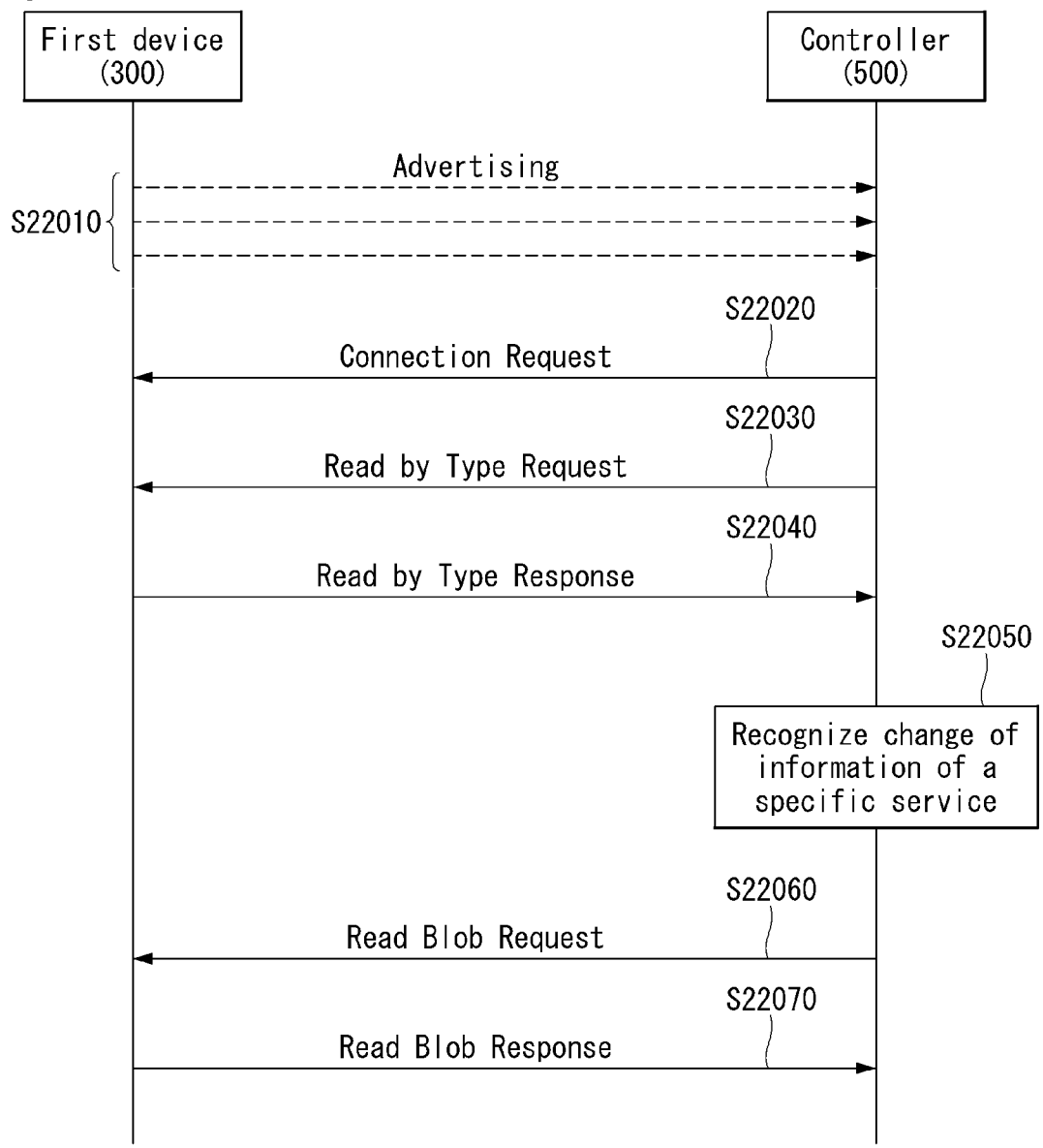

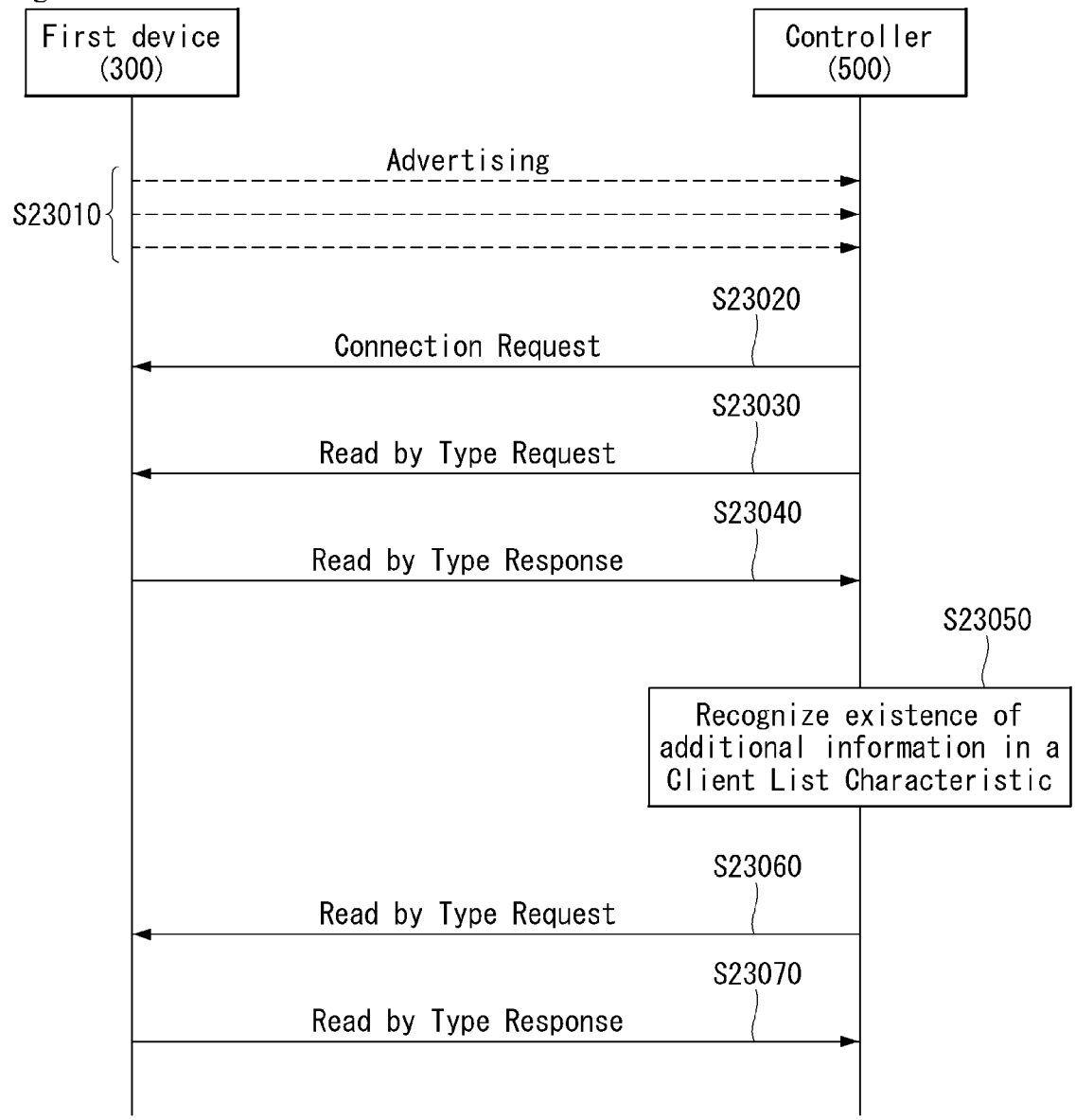

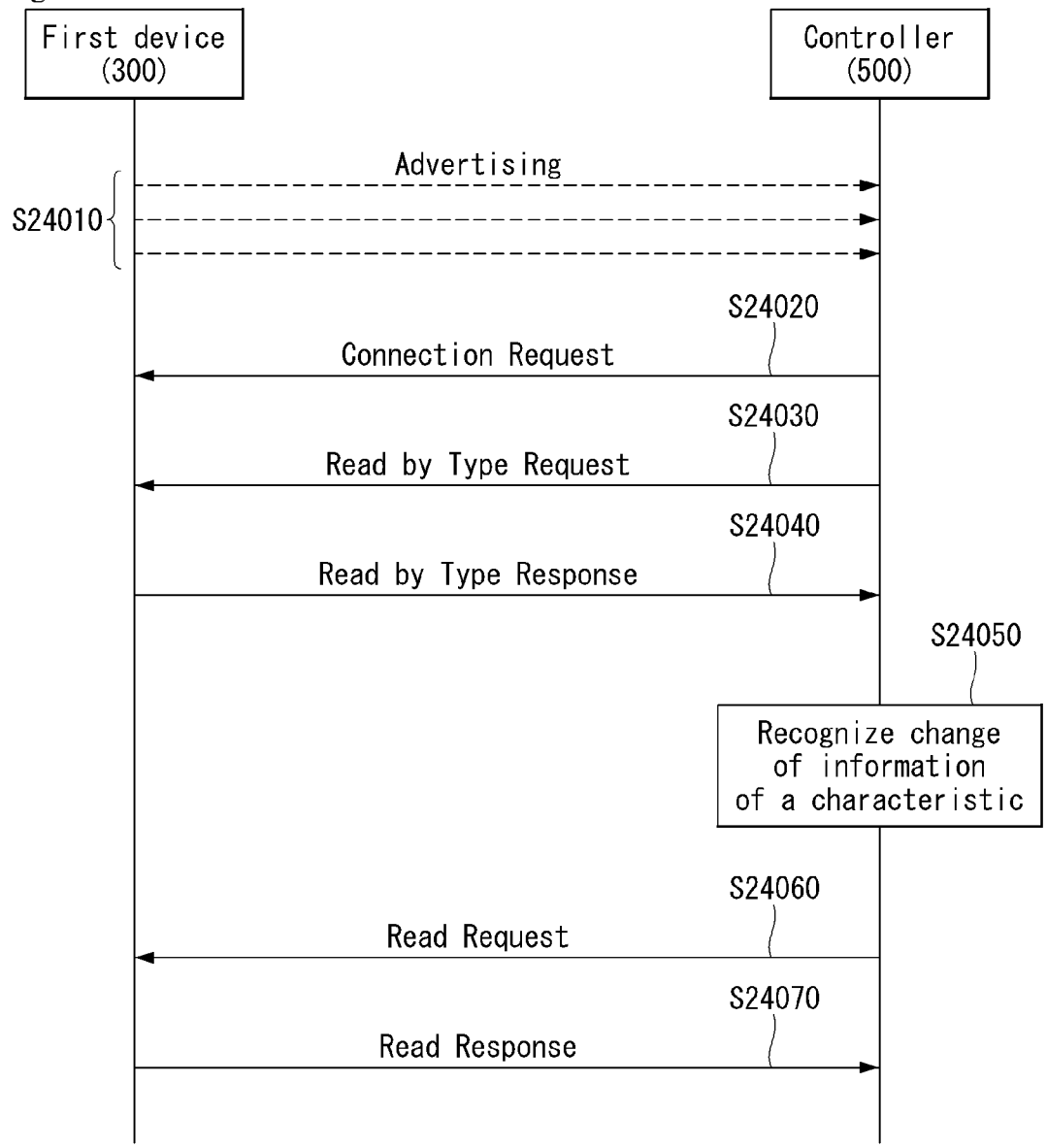

Fig.25

| Field Name | Number Of Changed Characteristic | Handle of Characteristic | Changed Contents |
|---|---|---|---|
| Data Type | 1byte | 2bytes | 1byte |

(a) Changed Characteristic list Characteristic

| 7th bit | 6th bit | 5th bit | 4th bit | 3rd bit | 2nd bit | 1st bit | 0th bit |
|---|---|---|---|---|---|---|---|
| Changed Method | | Reserved For Future Use | | | | Declaration | Value |

(b) Changed Contents

Fig.26

| Field Name | Number Of Changed Characteristic | UUID type | UUID of Characteristic | Changed Contents |
|---|---|---|---|---|
| Data Type | 1byte | 1byte | 2bytes ~ 16bytes | 1byte |

(a) Changed Characteristic list Characteristic

| 7th bit | 6th bit | 5th bit | 4th bit | 3rd bit | 2nd bit | 1st bit | 0th bit |
|---|---|---|---|---|---|---|---|
| Changed Method | | Reserved For Future Use | | | | Declaration | Value |

(b) Changed Contents

Fig.28

| Field Name | Service Modification | Characteristic Value Modification |
|---|---|---|
| Data Type | 1byte - | 1byte - |
| DESCRIPTION | WHEN SERVICE IS CHANGED, FIELD VALUE IS CHANGED | WHEN CHARACTERISTIC VALUE IS CHANGED, FIELD VALUE IS CHANGED |

Fig.29

| Attribute Handle | Attribute Type | Attribute Value | Attribute Permission |
|---|---|---|---|
| 0xNNNN | 0x2800 – UUID for <<Primary Service>> OR 0x2801 for <<Secondary Service>> | 16-bit Bluetooth UUID or 128-bit UUID for Service | Read Only, No Authentication, No Authorization |

(a)

| Attribute Handle | Attribute type | Attribute value | Modified field | Attribute permission |
|---|---|---|---|---|
| 0xNNNN | | | VALUE OF 1 BYTE OR MORE | |

| Attribute Handle | Attribute Type | Attribute Value | | | Attribute Permission |
|---|---|---|---|---|---|
| 0xNNNN | 0x2802 - UUID for <<Include>> | Included Service Attribute Handle | End Group Handle | Service UUID | Read Only, No Authentication, No Authorization |

(a)

| Attribute Handle | Attribute type | Attribute value | | | Modified field | Attribute permission |
|---|---|---|---|---|---|---|
| 0xNNNN | | Included Service Attribute Handle | End Group Handle | Service UUID | VALUE OF 1 BYTE OR MORE | |

| Attribute Handle | Attribute Types | Attribute Value | | | Attribute Permissions |
|---|---|---|---|---|---|
| 0xNNNN | 0x2802 – UUID for <<Characteristic>> | Characteristic Properties | Characteristic Value Attribute Handle | Characteristic UUID | Read Only, No Authentication, No Authorization |

(a)

| Attribute Handle | Attribute type | Attribute value | | | Modified field | Attribute permission |
|---|---|---|---|---|---|---|
| 0xNNNN | | Characteristic Properties | Characteristic Value Attribute Handle | Characteristic UUID | VALUE OF 1 BYTE OR MORE | |

| Field Name | ATT Features | GATT Features |
|---|---|---|
| Data Type | 2bytes | 3bytes |
| DESCRIPTION | PROVIDING INFORMATION OF IMPLEMENTED ATT PDU TYPE | PROVIDING INFORMATION OF IMPLEMENTED GATT PROCEDURE TYPE |

Fig.36

| Bit | MEANINGS |
|---|---|
| 0 | WHETHER ERROR HANDLING FUNCTION IS IMPLEMENTED |
| 1 | WHETHER MTU EXCHANGE FUNCTION IS IMPLEMENTED |
| 2 | WHETHER FIND INFORMATION (REQUEST/RESPONSE) FUNCTION IS IMPLEMENTED |
| 3 | WHETHER FIND BY TYPE VALUE (REQUEST/RESPONSE) FUNCTION IS IMPLEMENTED |
| 4 | WHETHER READ BY TYPE (REQUEST/RESPONSE) FUNCTION IS IMPLEMENTED |
| 5 | WHETHER READ (REQUEST/RESPONSE) FUNCTION IS IMPLEMENTED |
| 6 | WHETHER READ BLOB (REQUEST/RESPONSE) FUNCTION IS IMPLEMENTED |
| 7 | WHETHER READ MULTIPLE (REQUEST/RESPONSE) FUNCTION IS IMPLEMENTED |
| 8 | WHETHER READ BY GROUP TYPE (REQUEST/RESPONSE) FUNCTION IS IMPLEMENTED |
| 9 | WHETHER WRITE (REQUEST/RESPONSE) FUNCTION IS IMPLEMENTED |
| 10 | WHETHER WRITE COMMAND FUNCTION IS IMPLEMENTED |
| 11 | WHETHER SIGNED WRITE COMMAND FUNCTION IS IMPLEMENTED |
| 12 | WHETHER HANDLE VALUE NOTIFICATION FUNCTION IS IMPLEMENTED |
| 13 | WHETHER HANDLE VALUE INDICATION/CONFIRMATION FUNCTION IS IMPLEMENTED |
| 14~15 | RESERVED FOR FUTURE USE |

ATT Features

Fig.37

| Bit | Meanings | |
|---|---|---|
| 0 | Whether server configuration procedure or exchange MTU sub-procedure function is provided | |
| 1 | Whether discover all primary services sub-procedure function is implemented | Replaceable with primary service discover procedure function when necessary |
| 2 | Whether discover primary service by service UUID sub-procedure function is implemented | |
| 3 | Whether discover relationship discovery procedure or find included services sub-procedure function is implemented | |
| 4 | Whether discover all characteristics of a service sub-procedure function is implemented | Replaceable with characteristic discovery procedure function when necessary |
| 5 | Whether discover characteristics by UUID sub-procedure function is implemented | |
| 6 | Whether discover all characteristic descriptors sub-procedure function is implemented | |
| 7 | Whether read characteristic value sub-procedure function is implemented | Replaceable with characteristic value read procedure function when necessary |
| 8 | Whether read using characteristic UUID sub-procedure function is implemented | |
| 9 | Whether read long characteristic value sub-procedure function is implemented | |
| 10 | Whether read multiple characteristic values sub-procedure function is implemented | |
| 11 | Whether write without response sub-procedure function is implemented | Replaceable with characteristic value write procedure function when necessary |
| 12 | Whether signed write without response sub-procedure function is implemented | |
| 13 | Whether write characteristic value sub-procedure function is implemented | |
| 14 | Whether write long characteristic value sub-procedure function is implemented | |
| 15 | Whether reliable writes sub-procedure function is implemented | |
| 16 | Whether characteristic value notifications sub-procedure function is implemented | |
| 17 | Whether characteristic value indications procedure or indications sub-procedure function is implemented | |
| 18 | Whether read characteristic descriptors sub-procedure function is implemented | Replaceable with characteristic descriptor read procedure function when necessary |
| 19 | Whether read long characteristic descriptors sub-procedure function is implemented | |
| 20 | Whether write characteristic descriptors sub-procedure function is implemented | Replaceable with characteristic descriptor write procedure function when necessary |
| 21 | Whether write long characteristic descriptors sub-procedure function is implemented | |
| 22-23 | Whether error handling function is implemented | |

METHOD AND DEVICE FOR CONTROLLING DEVICE BY USING BLUETOOTH TECHNOLOGY

CROSS REFERENCE TO RELATED APPLICATIONS

This application is the National Phase of PCT International Application No. PCT/KR2018/000058, filed on Jan. 2, 2018, which claims the benefit of U.S. Provisional Application No. 62/441,555, filed on Jan. 2, 2017, and No. 62/457,741, filed on Feb. 10, 2017, all of which are hereby expressly incorporated by reference into the present application.

TECHNICAL FIELD

The present invention relates to a method and an apparatus for controlling a device by using BLUETOOTH (also referred to herein as Bluetooth), a short-range communication technology in a wireless communication system and more specifically, a method and an apparatus for controlling a device to establish a connection between devices by using Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present invention is to provide a method and an apparatus for controlling a device by using the Bluetooth technology.

Also, an object of the present invention is to provide a method and an apparatus for a control device to control a device to form a connection by obtaining information of services operated as a client from the device by using the Bluetooth technology.

Also, an object of the present invention is to provide a method and an apparatus for a control device to control a device to form a connection by obtaining information of services operated as a server from the device by using the Bluetooth technology.

Also, an object of the present invention is to provide a method and an apparatus to inform a control device of change of specific information when the specific information of a controlled device is changed.

Also, an object of the present invention is to provide a method and an apparatus for obtaining changed specific information when the specific information of devices controlled by a control device is changed.

Also, in case characteristic information of devices controlled by a control device exceeds a predetermined size, an object of the present invention is to provide a method and an apparatus for obtaining the remaining characteristic information through an additional message.

Also, an object of the present invention is to provide a method and an apparatus for recognizing changes of services of devices controlled by a control device and characteristic values of characteristics related to the services.

Also, an object of the present invention is to provide a method and an apparatus for searching changed services and characteristic values of characteristics of devices controlled by a control device.

Also, an object of the present invention is to provide a method and an apparatus for recognizing functions supported between devices for compatibility between a control device and controlled devices.

Technical objects of the present invention are not limited to those described above, but other technical objects not mentioned in this document will be clearly understood from the descriptions given below by those skilled in the art to which the present invention belongs.

Technical Solution

In order to solve the aforementioned problem, provided is a method for discovering, by a first device, a service by using Bluetooth in a wireless communication system.

Specifically, according to an embodiment of the present invention, a method for searching, by a first device, a service in a wireless communication includes: forming a Bluetooth LE connection with a second device; receiving, from the second device, a first message for indicating whether a service supported by the second device is changed; and searching at least one of a service or a characteristic of the service based on the first message, in which the first message includes a first value related to a change of the service supported by the second device and a second value related to a change of a characteristic value of the service.

Furthermore, in the present invention, the searching includes determining whether the service is changed based on the first value, when the first value represents the change of the service, searching the changed service, determining whether the characteristic value is changed based on the second value, and when the second value represents the change of the characteristic value, searching the changed characteristic value.

Furthermore, in the present invention, the first value is a first hash value representing the service and the second value is a second hash value representing the characteristic value.

Furthermore, in the present invention, the method further includes determining whether the first hash value or the second hash value is changed, in which when the first hash value is changed, the service represented by the first hash value is searched, and when the second hash value is changed, the service represented by the second hash value is searched.

Furthermore, in the present invention, the method further includes: searching a primary service supported by the second device; and searching the characteristic value of the searched primary service.

Furthermore, in the present invention, the method further includes: transmitting, to the second device, a read request message for requesting reading of a characteristic value of a first characteristic for compatibility with the second device; and receiving a read response message including a first characteristic value of the first characteristic in response to the read request message, in which the first characteristic value represents at least one function supported by the second device.

Furthermore, in the present invention, the read request message includes a second characteristic value of a second characteristic for compatibility with the first device, and the second characteristic value represents at least one function supported by the first device.

Furthermore, in the present invention, the method further includes: transmitting, to the second device, a write request message for requesting writing of the first characteristic value of the first characteristic for compatibility with the first device, in which the first characteristic value represents at least one function supported by the first device; and receiving a write response message including the second characteristic value of the second characteristic for compatibility with the second device in response to the write request message, in which the second characteristic value represents at least one function supported by the second device.

Furthermore, according to the present invention, provided is a first device for searching a service in a wireless communication which includes: a communication unit which wirelessly or wiredly communicates with the outside; and a processor functionally connected with the communication unit, in which the processor is configured to form a Bluetooth LE connection with a second device, receive, from the second device, a first message for indicating whether a service supported by the second device is changed, and search at least one of a service or a characteristic of the service based on the first message, and the first message includes a first value related to a change of the service supported by the second device and a second value related to a change of a characteristic value of the service.

Advantageous Effects

According to a method for controlling a device by using the Bluetooth technology according to one embodiment of the present invention, a control device may control forming a connection to other device.

Also, according to the present invention, forming a connection between devices may be controlled according to their role in a service by obtaining information of services in which a device operates as a client and/or information of services in which a device operates as a server.

Also, according to the present invention, in case the size of characteristic information is larger than a predetermined value, the remaining information may be obtained through an additional message by informing a control device of existence of the characteristic information.

Also, according to the present invention, in case service information of controlled devices is changed, a control device may obtain only the changed service information by transmitting to the control device the information specifying the service, the information of which has been changed.

Also, according to the present invention, in case characteristic information related to a service of controlled devices is changed, a control device may obtain only the changed characteristic information by transmitting to the control device the information specifying the characteristic, the information of which has been changed.

Also according to the present invention, the control device can recognize changes of services and characteristic values of controlled devices.

Also, according to the present invention, the control device can recognize changed services and characteristics through a search procedure when the services and the characteristic values of the controlled devices are changed.

Also, according to the present invention, information related to supported functions is exchanged between the control device and the controlled devices, thereby enhancing compatibility of the control device and the controlled devices.

The advantageous effects that may be obtained from the present invention are not limited to those described above, and other effects not mentioned above may be understood clearly by those skilled in the art to which the present invention belongs from the following descriptions.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 10 illustrates one example of a structure of service information representing a service for controlling a device to which the present invention may be applied.

FIGS. 15 to 17 illustrate one example of characteristics related to a service wherein a device operates as a client according to the present invention.

FIG. 18 illustrates one example of characteristic related to a service wherein a device operates as a server according to the present invention.

FIG. 19 illustrates one example of a method for transmitting and receiving specific information through a plurality of messages if the specific information exceeds a predetermined size according to the present invention.

FIGS. 20 and 21 illustrate one example of a characteristic related to a service structure according to the present invention.

FIG. 22 is a flow diagram illustrating one example of a method for transmitting and receiving information of a changed service in case information related to a service changes according to the present invention.

FIG. 23 is a flow diagram illustrating a method for transmitting and receiving additional information through a plurality of messages in case characteristic information may provide additional information according to the present invention.

FIG. 24 is a flow diagram illustrating one example of a method for transmitting and receiving changed characteristic information in case characteristic information is changed according to the present invention.

FIGS. 25 and 26 illustrate one example of characteristics related to change of characteristic information according to the present invention.

FIGS. 27 and 28 are diagrams illustrating one example of a method for recognizing whether services and characteristics are changed and a data format according to the present invention.

FIGS. 29 to 31 are diagrams illustrating one example of an attribute for recognizing whether services and characteristics are changed and a data format according to the present invention.

FIGS. 35 to 37 are diagrams illustrating one example of function information for enhancing compatibility between devices according to the present invention.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
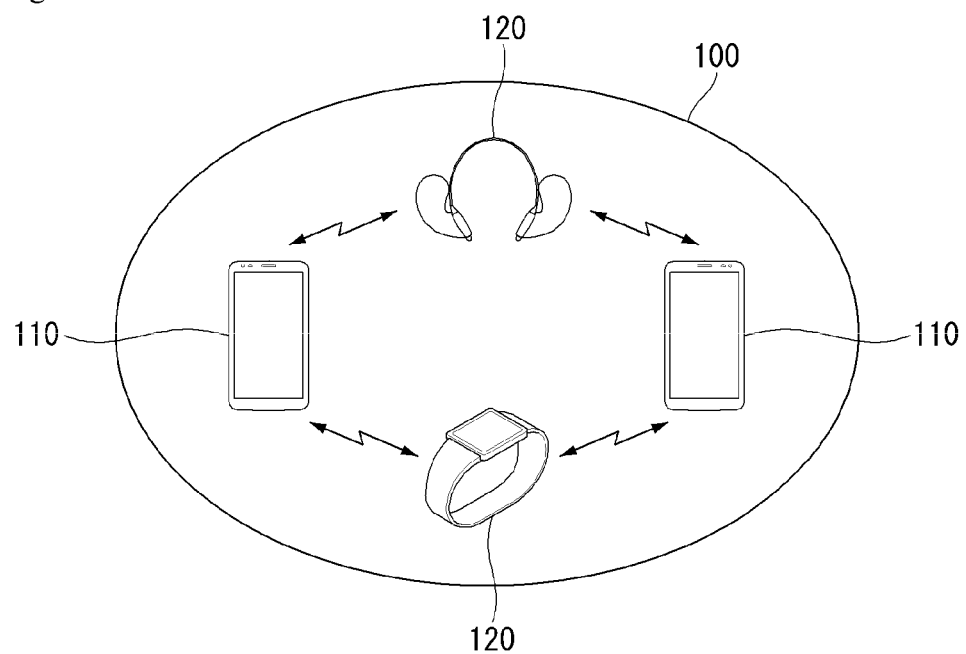
FIG. 1 illustrates one example of a wireless communication system employing Bluetooth Low Energy (LE) technology to which the present invention may be applied.

FIG. 1 illustrates one example of a wireless communication system employing Bluetooth Low Energy (LE) technology to which the present invention may be applied.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device may be expressed as a master device, a master, a client, a member, a sensor device, a sink device, a collector, a third device, a fourth device, etc.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
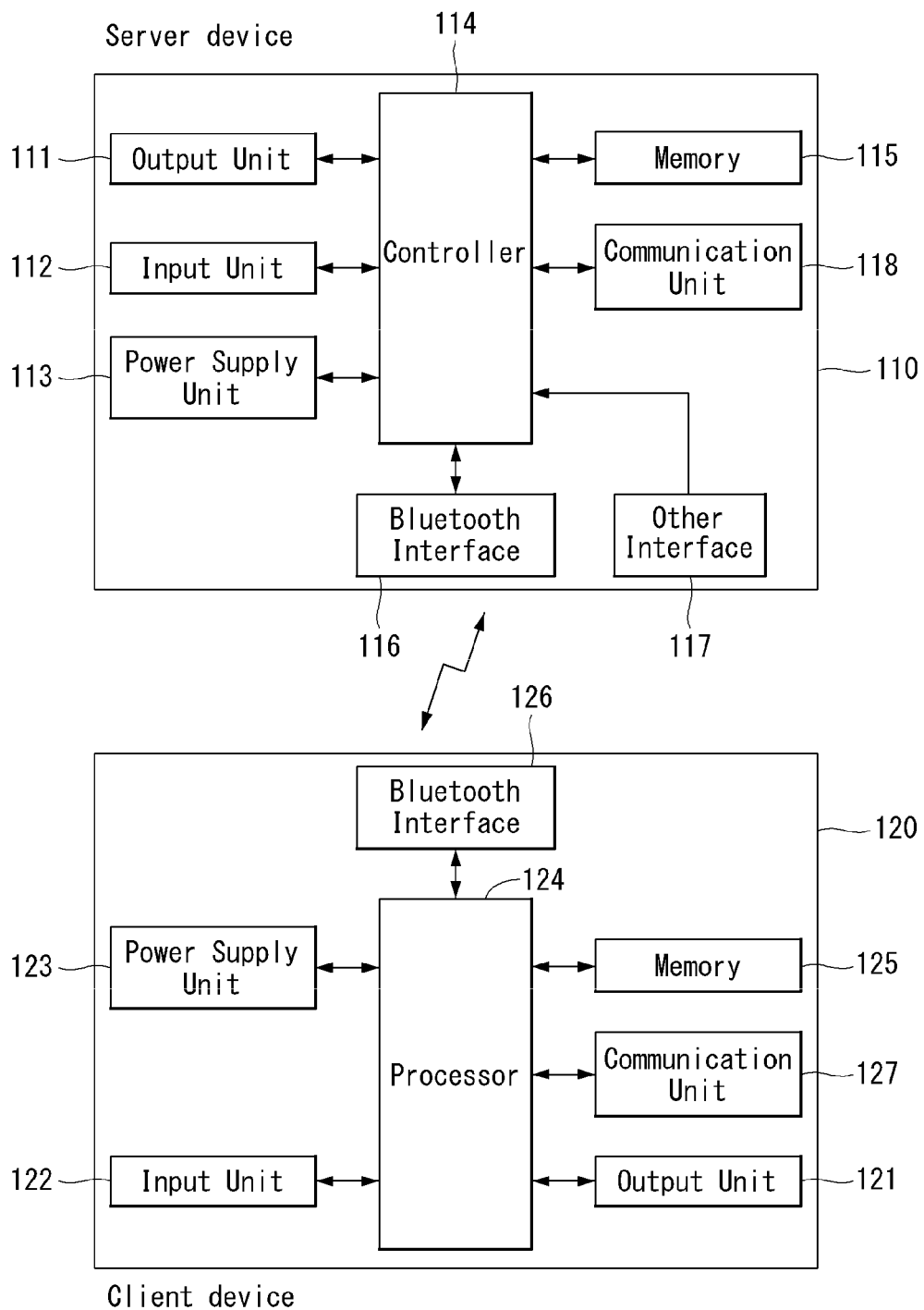
FIG. 2 illustrates one example of an internal block diagram of a device to which the present invention may be applied.

FIG. 2 illustrates one example of an internal block diagram of a device to which the present invention may be applied.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules which receive external power and internal power and provide power necessary for operation of components under the control of the processor.

As described above, BLE technology has a small duty cycle and can remarkably reduce power consumption through a low data rate.

The input units 112 and 122 refer to modules which provide user input through a screen button, for example, to the controller such that the user can control device operation.

Figure 3:
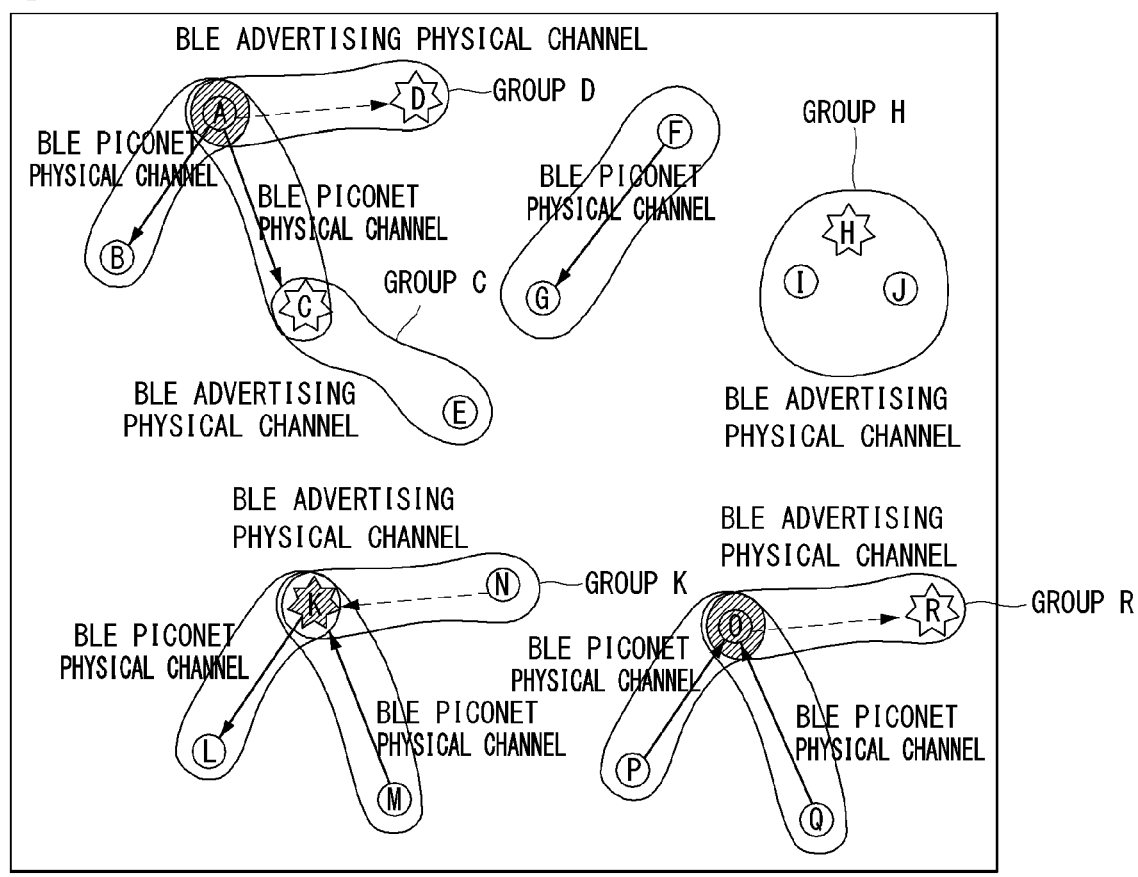
FIG. 3 illustrates one example of Bluetooth LE topology to which the present invention may be applied.

FIG. 3 illustrates one example of Bluetooth LE topology to which the present invention may be applied.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator.

The device O may establish a connection with the device R. In this case, the device O functions as a slave of two devices and also a master of one device.

Figure 4:
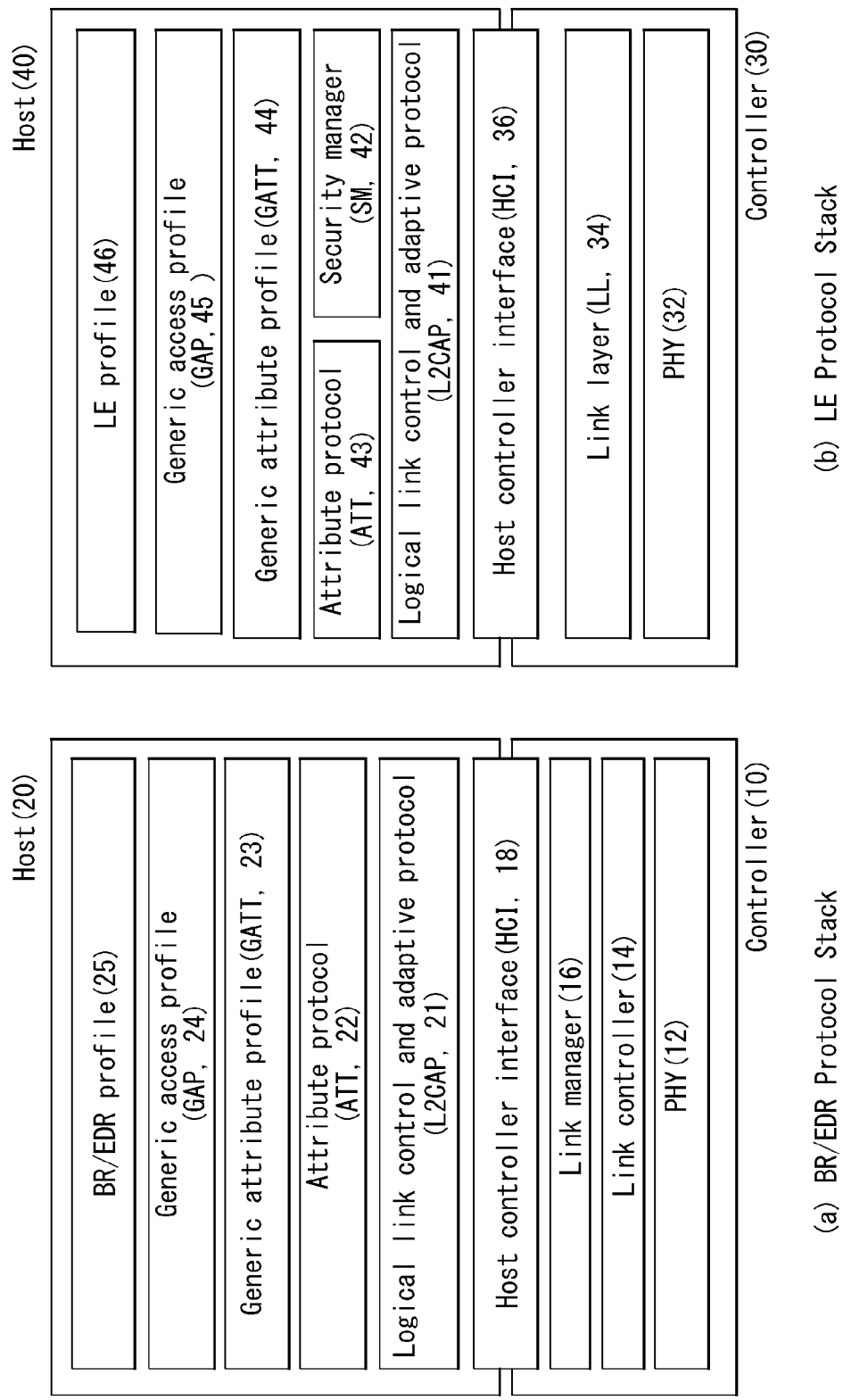
FIG. 4 illustrates one example of Bluetooth communication architecture to which the present invention may be applied.

FIG. 4 illustrates one example of Bluetooth communication architecture to which the present invention may be applied.

Referring to FIG. 4, FIG. 4(a) illustrates an example of a Bluetooth BR (Basic Rate)/EDR (Enhanced Data Rate) protocol stack and FIG. 4(b) illustrates an example of a Bluetooth LE (Low Energy) protocol stack.

Specifically, as illustrated in FIG. 4(a), the Bluetooth BR/EDR protocol stack may include a controller stack 10 and a host stack 20 above and below a host controller interface (HCI) 18.

The host stack (or host module) 20 refers to hardware for transmitting or receiving Bluetooth packets to or from a wireless transceiver module receiving 2.4 GHz Bluetooth signals and is connected to the Bluetooth module corresponding to the controller stack 10 to control the Bluetooth module and perform operations.

The controller stack 10 may include a PHY layer 12, a link controller layer 14 and a link manager layer 16.

The PHY layer 12 transmits and receives 2.4 GHz radio signals and can hop 79 RF channels and transmit data when GFSK (Gaussian Frequency Shift Keying) modulation is used.

The link controller layer 14 serves to transmit digital signals, selects a channel sequence hopping 1400 times per second and transmits a 625 µs time slot per channel.

The link manager layer 16 controls overall operations (link setup, control and security) of Bluetooth connection using LMP (Link Manager Protocol).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in FIG. 4(b), the Bluetooth LE protocol stack includes a controller stack 30 operable to process a wireless device interface for which timing is important and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

A description will be given of procedures of the BLE technology.

The BLE procedures may be classified into a device filtering procedure, an advertising procedure, a scanning procedure, a discovery procedure and a connection procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
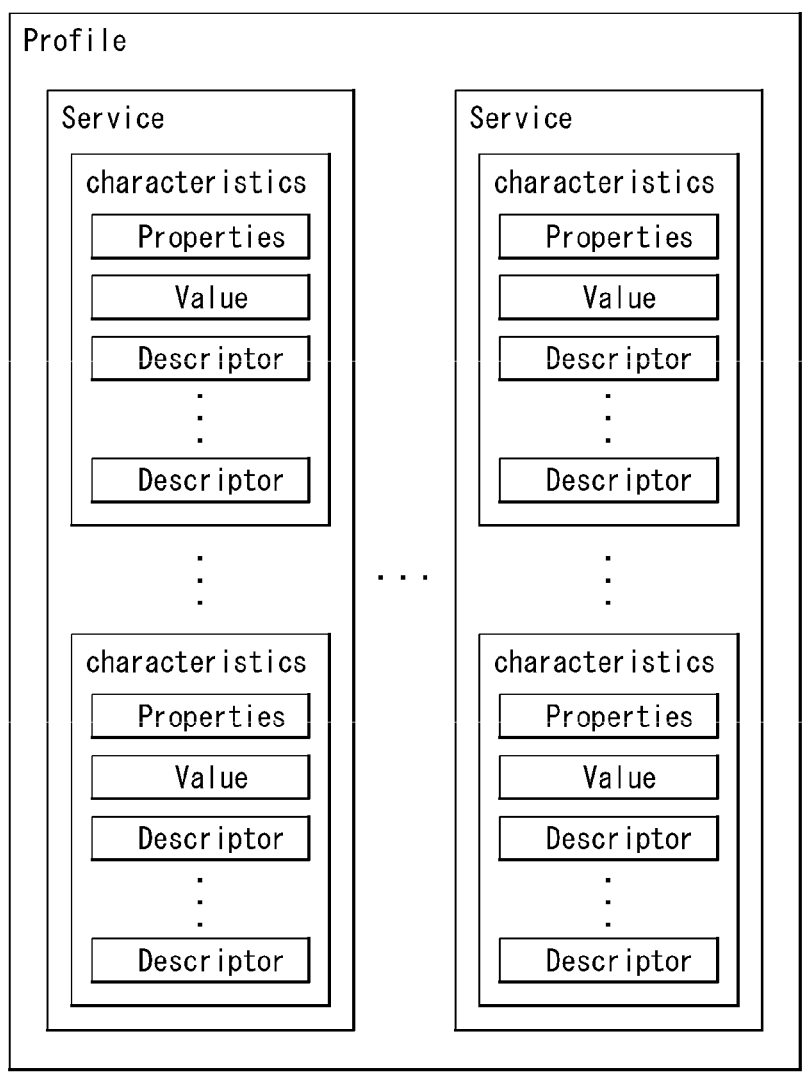
FIG. 5 illustrates one example of GATT (Generic Attribute Profile) structure of Bluetooth LE technology to which the present invention may be applied.

FIG. 5 illustrates an example of a structure of a GATT (Generic Attribute Profile) of Bluetooth low energy.

Referring to FIG. 5, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method for acquiring combination information on a device to be controlled by a control device through the GATT and information related to controllable operation to control the device.

Figure 6:
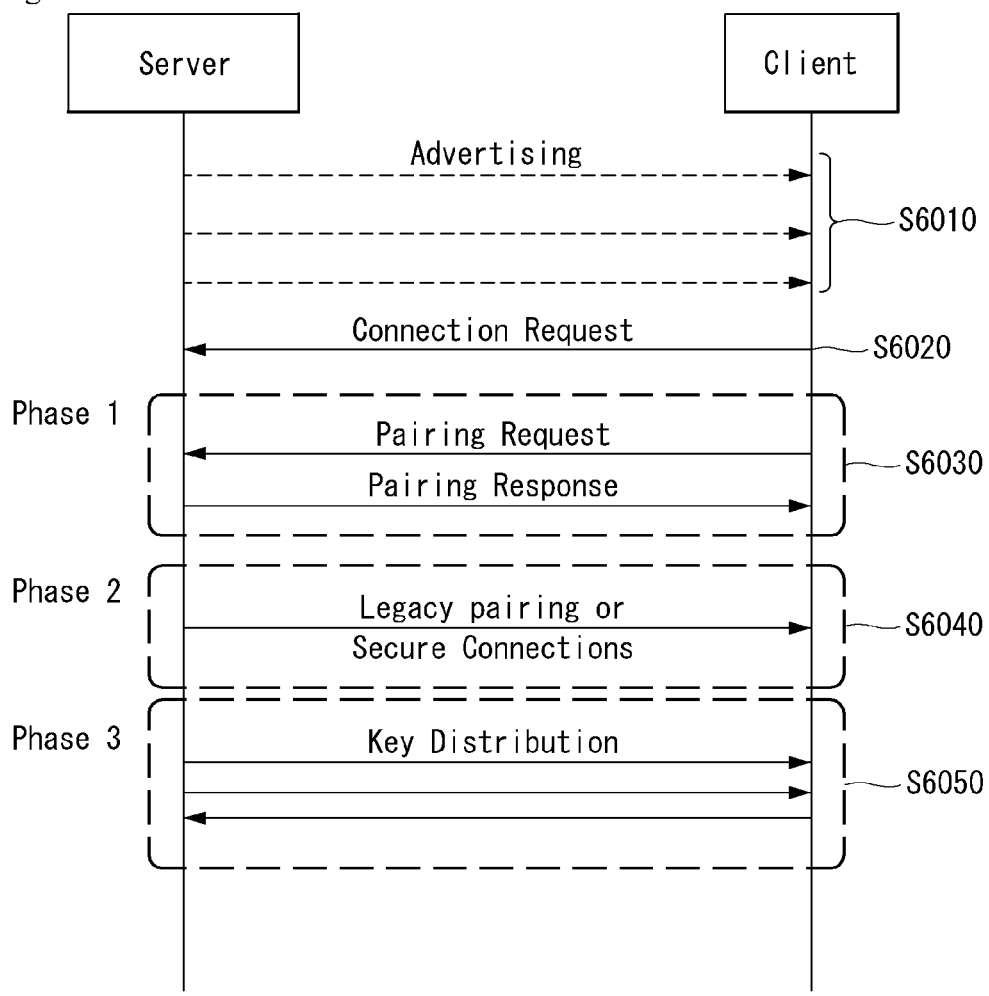
FIG. 6 is a flow diagram illustrating one example of a connection method based on Bluetooth LE technology to which the present invention may be applied.

FIG. 6 shows an example of a method for the connection procedure of the BLE specification.

A server sends an advertisement message through three advertisement channels (S6010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response, together with the remaining data, to the client in response to the scan request.

In this case, the scan request and the scan response are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request for establishing BLE with the server (S6020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S6030).

Through the pairing procedure, the client sends a pairing request to the server, and the server sends a pairing response to the client.

Through the pairing procedure, authentication requirements and input (I)/output (O) capabilities and Key Size information are sent and received between the devices. Through the information, which key generation method is to be used in Phase 2 is determined.

Next, in the phase 2, a legacy pairing or secure connection is performed between the server and the client (S6040).

In Phase 2, A 128-bit temporary key and a 128-bit short term key (STK) for performing the legacy pairing are generated.

Temporary Key: Key made for creating the STK
Short Term Key(STK): Key value used for making encrypted connection between devices When the secure connection is performed in Phase 2, a 128-bit long term key (LTK) is generated.

Long Term Key(LTK): Key value used even in later connection in addition to encrypted connection between the devices In the SSP phase 3, a key distribution procedure is performed between the server and the client (S6050).

Through the phases, a secure connection is established between the server and the client, and encrypted data may be transmitted and received.

Figure 7:
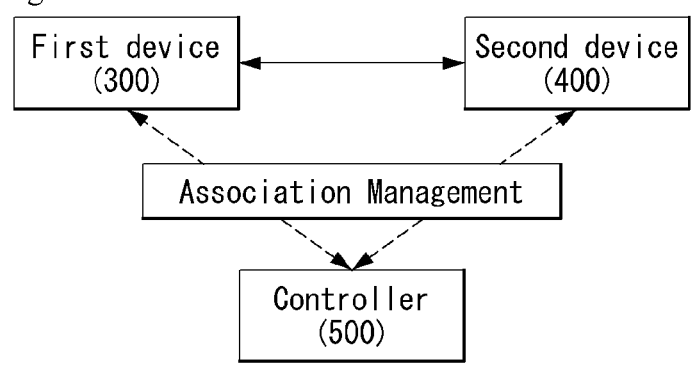
FIG. 7 illustrates a method for controlling other device by using a control device to which the present invention may be applied.

FIG. 7 illustrates a method for controlling other device by using a control device to which the present invention may be applied.

As shown in FIG. 7, a controller 500 is needed to control the operation between a first device 300 and a second device 400, and the third device 500 needs a new control protocol to control association between the first 300 and the second device 400.

At this time, the controller 500 has to know the information of the devices (for example, interface information and service information) to control the operation of the devices.

Also, in a Bluetooth connection, after devices are connected to each other, a search is conducted to determine which service (application) is provided by an actual device.

The aforementioned procedure is conducted so because the Bluetooth SIG seeks standardization of various applications differently from other connection technologies, and the same Bluetooth device is thus unable to interpret received data if a different application is employed for the device, thereby being unable to provide a service even if data are transmitted and received.

Therefore, after forming a Bluetooth connection, devices have to figure out a service being provided.

However, since the current search method employed by the Bluetooth standard provides only server-based information, the controller, which is a third device, is unable to discover a device performing the role of a client in a specific service. Therefore, in case the controller connects Bluetooth devices, the controller is unable to determine which service is being provided.

Also, in case a client connects one-to-one to a server, the client has no other way to know whether server data has changed. Therefore, to check the changed data, the initial characteristic and service discovery procedure has to be performed again.

Therefore, to solve the technical problem above, the present invention provides a method for a controller to discover a device performing the role of a client and a method for a client to check and receive only the changed data in the event of a change of server data.

Figure 8:
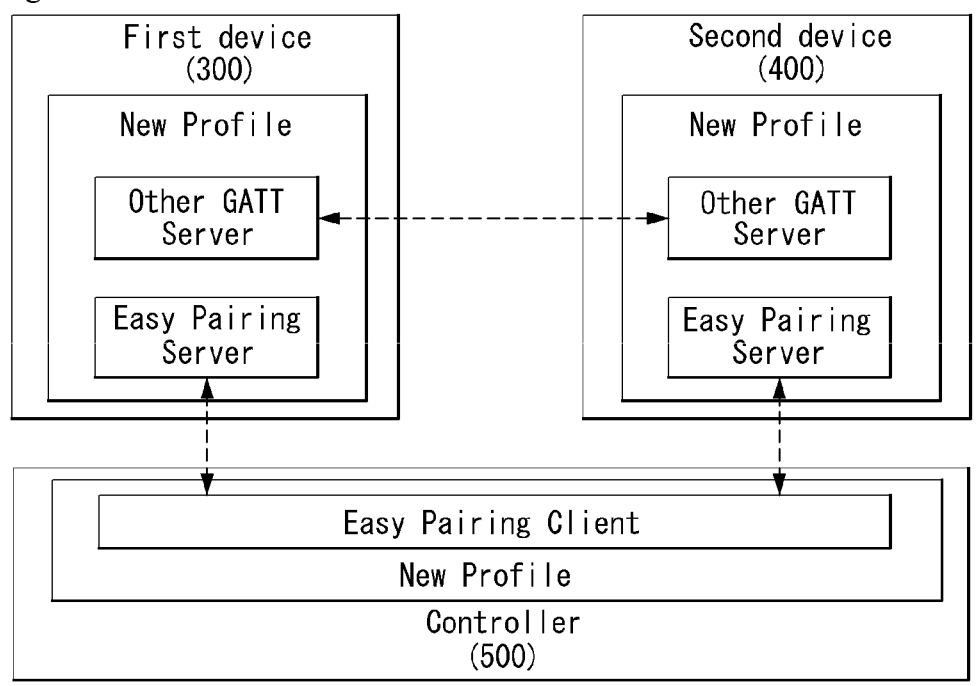
FIGS. 8 and 9 illustrate one example of a profile structure for providing a service for controlling a device to which the present invention may be applied.
Figure 9:
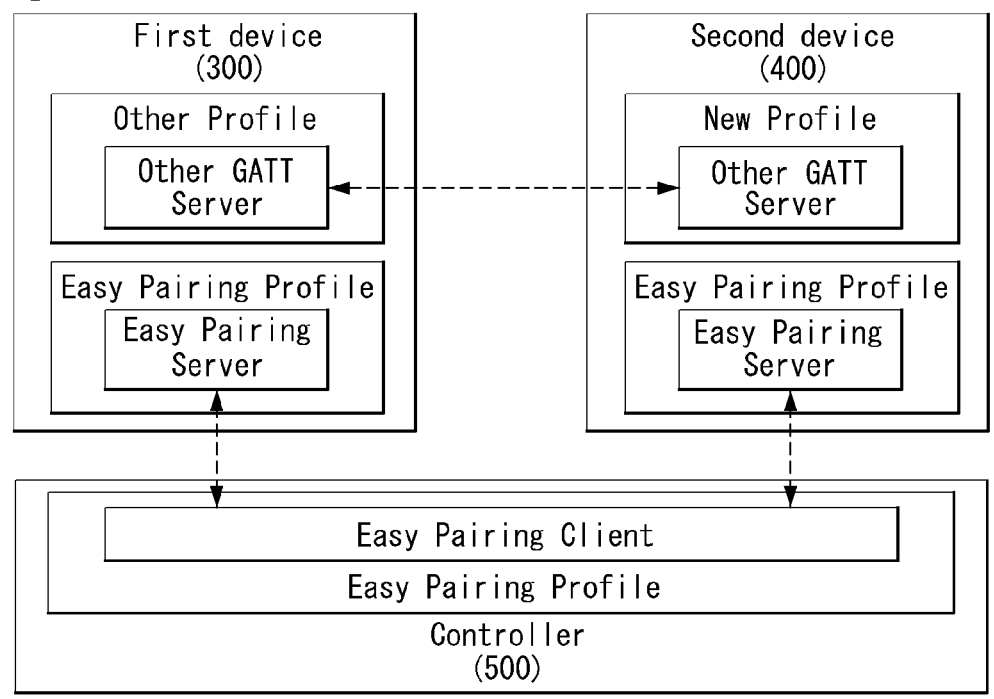

FIGS. 8 and 9 illustrate one example of a profile structure for providing a service for controlling a device to which the present invention may be applied.

Referring to FIGS. 8 and 9, a service for a control device to control other devices may be included in the profile of other services or may be defined in a separate profile.

In what follows, the service for the control device to control other devices according to the present invention is called an easy pairing service.

The controller 500 controlling devices may control other devices through the easy pairing service. For example, the controller 500 may control operations related to association between a first device 300 and a second device 400 (for example, connection, pairing, or bonding) through an easy pairing service.

At this time, the easy pairing service may be included in the profile of other service as illustrated in FIG. 8 or may be defined by a separate profile as illustrated in FIG. 9.

As shown in FIG. 8, suppose the easy pairing service is not defined in a separate profile but included in the profile of a specific service. An example of such as case is when the easy pairing service is defined as a secondary service (or as an included service) related to other primary service. In this case, operation of one application may be described in a convenient manner.

However, the easy pairing service may not cover the service based on a profile not including the easy pairing service and requires a clear definition for each individual device.

Furthermore, as shown in FIG. 9, suppose an easy pairing service is defined in a separate profile (for example, in case the easy pairing service is not related to other primary service but defined as an independent primary service or secondary service (or included service)). Then the server-client structure may still be compatible at the profile level, and the easy pairing service may be expanded to include other profiles.

FIG. 10 illustrates one example of a structure of service information representing a service for controlling a device to which the present invention may be applied.

Referring to FIG. 10, as illustrated in FIG. 9, the easy pairing service may be defined as a primary service or an included service.

In case the easy pairing service is defined as a primary service, the following characteristics may be supported.

It has the Supported Client List which should include same UUID of Target1's Supported Primary Service as the Client function.

The Supported Client List is used to match the common service capabilities between Targets by the Connection Manager.

If the easy pairing service is defined as an included service of a specific service defined as a primary service, the specific service related to the easy pairing service may be searched for through the characteristics shown in FIG. 10.

The characteristics shown in FIG. 10 are intended to recognize the information of a primary service of the easy pairing service and may comprise a Service Type field, Primary Service UUID, and Security Requirements field.

At this time, properties of the characteristics shown in FIG. 10 and the respective fields are described as follows.

Properties: Read Characteristic Value

Service Type: indicate the type (or length) of the followed Primary Service UUID 0x01: 16 bits UUID 0x02: 32 bits UUID 0x03: 128 bits UUID Primary Service UUID: indicate the Primary Service UUID including Easy Pairing Service. Its length depends on the value of Service UUID Security Requirements: indicate the Security Requirements of for Primary Service 0x01: unauthenticated without encryption, no pairing 0x02: unauthenticated with encryption, Just Works Pairing without Connection Manager 0x03: authenticated with encryption, Secure Connection via Connection Manager.

Figure 11:
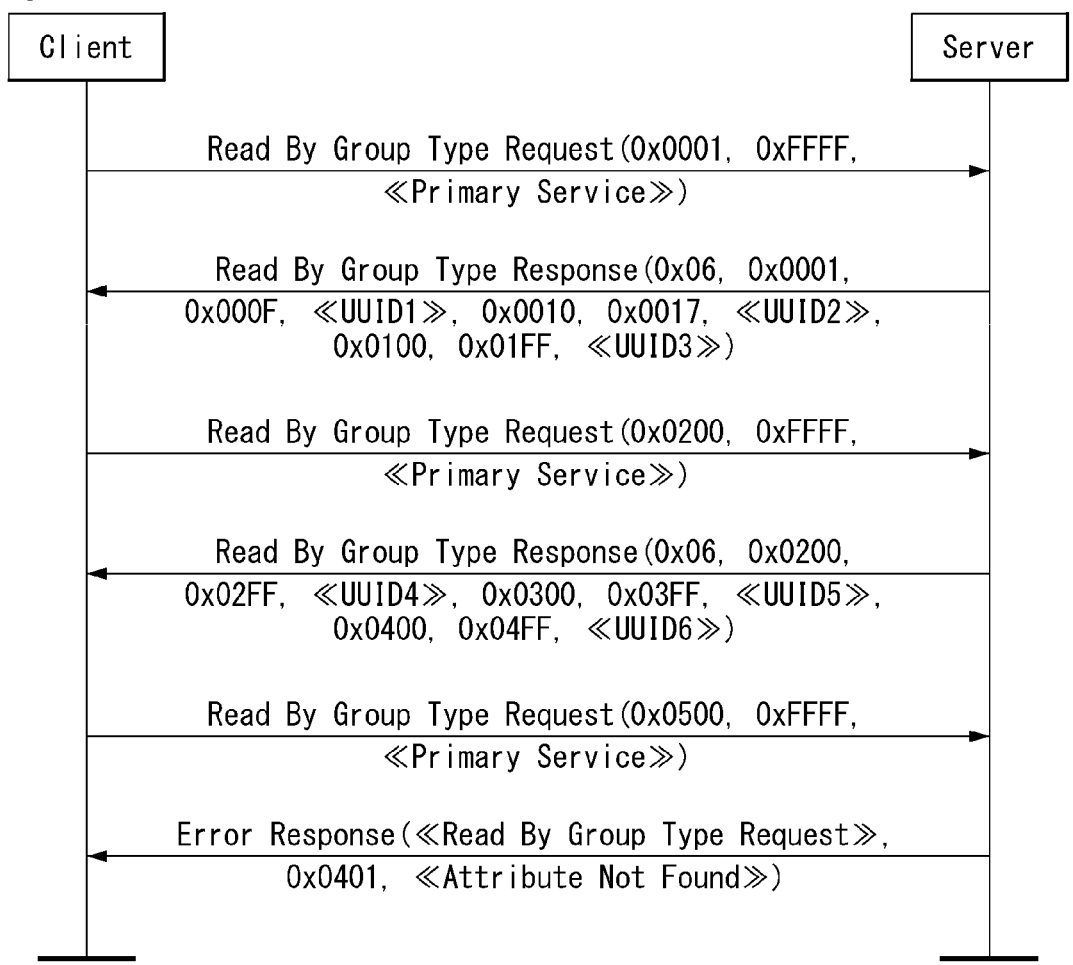
FIGS. 11 and 12 are flow diagrams illustrating a method for searching for information of a Primary Service to which the present invention may be applied.
Figure 12:
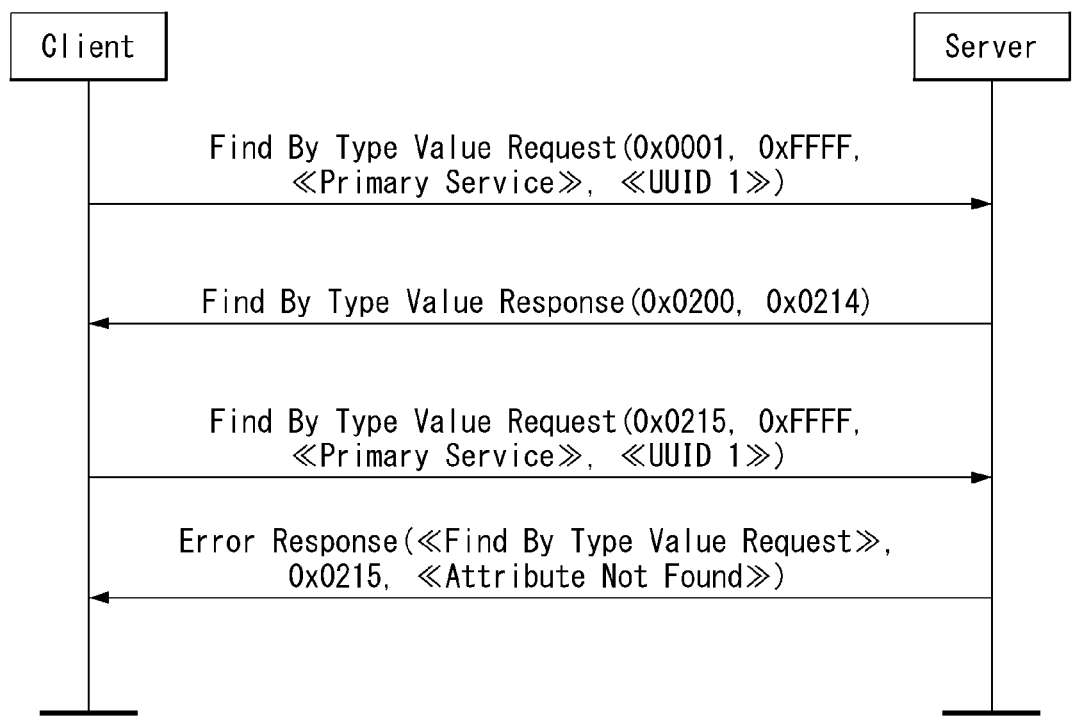

FIGS. 11 and 12 are flow diagrams illustrating a method for searching for information of a Primary Service to which the present invention may be applied.

Referring to FIGS. 11 and 12, the client may discover primary services of the server.

Once the primary services are discovered, additional information about the primary services can be accessed using other procedures, including characteristic discovery and relationship discovery to find other related primary and secondary services.

FIG. 11 is a flow diagram illustrating one example of a method for the client to discover all of the primary services of the server.

Referring to FIG. 11, this sub-procedure is used by a client to discover all the primary services on a server.

The Attribute Protocol Read By Group Type Request shall be used with the Attribute Type parameter set to the UUID for «Primary Service».

The Starting Handle shall be set to 0x0001 and the Ending Handle shall be set to 0xFFFF.

Two possible responses can be sent from the server for the Read By Group Type Request: Read By Group Type Response and Error Response.

Error Response is returned if an error occurred on the server.

Read By Group Type Response returns a list of Attribute Handle, End Group Handle, and Attribute Value tuples corresponding to the services supported by the server.

Each Attribute Value contained in the response is the Service UUID of a service supported by the server. The Attribute Handle is the handle for the service declaration.

The End Group Handle is the handle of the last attribute within the service definition. The End Group Handle of the last service in a device can be 0xFFFF.

The Read By Group Type Request shall be called again with the Starting Handle set to one greater than the last End Group Handle in the Read By Group Type Response.

This sub-procedure is complete when the Error Response is received and the Error Code is set to «Attribute Not Found» or when the End Group Handle in the Read by Type Group Response is 0xFFFF.

It is permitted to end the sub-procedure early if a desired primary service is found prior to discovering all the primary services on the server.

FIG. 12 is a flow diagram illustrating one example of a method for the client to discover specific primary services of the server in case the client knows the UUID (Universal Unique Identifier) of the services.

Referring to FIG. 12, the specific primary service may exist multiple times on a server. The primary service being discovered is identified by the service UUID.

The Attribute Protocol Find By Type Value Request shall be used with the Attribute Type parameter set to the UUID for «Primary Service» and the Attribute Value set to the 16-bit Bluetooth UUID or 128-bit UUID for the specific primary service.

The Starting Handle shall be set to 0x0001 and the Ending Handle shall be set to 0xFFFF.

Two possible responses can be sent from the server for the Find By Type Value Request: Find By Type Value Response and Error Response.

Error Response is returned if an error occurred on the server.

Find By Type Value Response returns a list of Attribute Handle ranges. The Attribute Handle range is the starting handle and the ending handle of the service definition. The End Group Handle of the last service in a device can be 0xFFFF. If the Attribute Handle range for the Service UUID being searched is returned and the End Found Handle is not 0xFFFF, the Find By Type Value Request may be called again with the Starting Handle set to one greater than the last Attribute Handle range in the Find By Type Value Response.

This sub-procedure is complete when the Error Response is received and the Error Code is set to «Attribute Not Found» or when the End Group Handle in the Find By Type Value Response is 0xFFFF.

It is permitted to end the sub-procedure early if a desired primary service is found prior to discovering all the primary services of the specified service UUID supported on the server.

Figure 13:
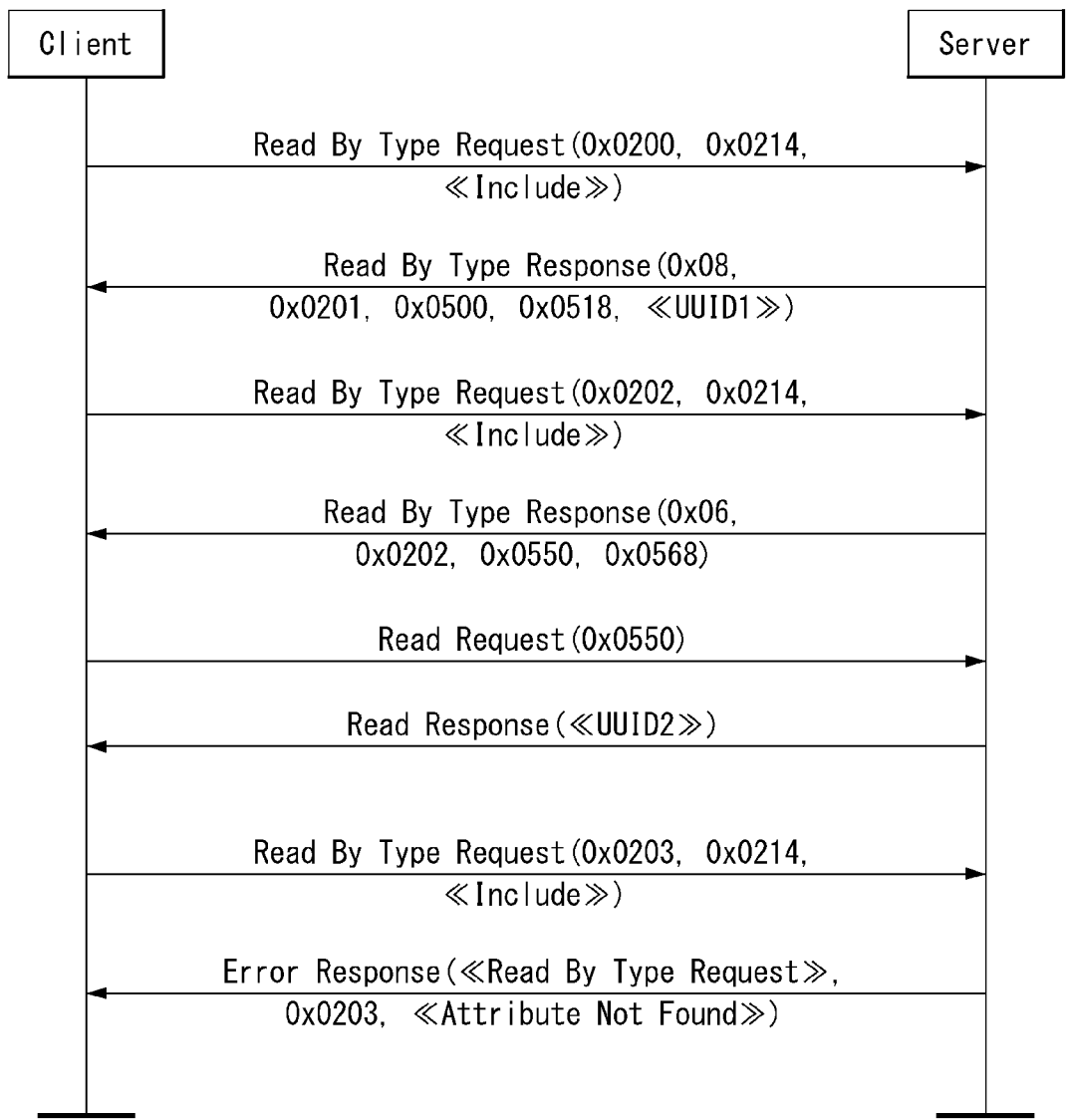
FIG. 13 is a flow diagram illustrating one example of a method for searching for information of an included service related to the primary service.

FIG. 13 is a flow diagram illustrating one example of a method for searching for information of an included service related to the primary service.

Referring to FIG. 13, the Attribute Protocol Read By Type Request shall be used with the Attribute Type parameter set to the UUID for «Include» The Starting Handle shall be set to starting handle of the specified service and the Ending Handle shall be set to the ending handle of the specified service. It is permitted to end the procedure early if a desired included service is found prior to discovering all the included services of the specified service supported on the server.

Two possible responses can be sent from the server for the Read By Type Request: Read By Type Response and Error Response.

Error Response is returned if an error occurred on the server.

Read By Type Response returns a set of Attribute Handle and Attribute Value pairs corresponding to the included services in the service definition. Each Attribute Value contained in the response is composed of the Attribute Handle of the included service declaration and the End Group Handle. If the service UUID is a 16-bit Bluetooth UUID it is also returned in the response. The Read By Type Request shall be called again with the Starting Handle set to one greater than the last Attribute Handle in the Read By Type Response.

The sub-procedure is complete when either the Error Response is received with the Error Code set to Attribute Not Found or the Read By Type Response has an Attribute Handle of the included service declaration that is equal to the Ending Handle of the request.

To get the included service UUID when the included service uses a 128-bit UUID, the Read Request is used. The Attribute Handle for the Read Request is the Attribute Handle of the included service.

However, since length of data that may be transmitted through one message is limited in the Bluetooth LE, all of the service information may not be transmitted through one message transmission when the length of service information is long.

Likewise, as described with reference to FIGS. 11 to 13, it takes a long time to search for a service due to the step-wise service discovery, and because of different UUID lengths among services (for example, 16 bit, 32 bit, and 128 bit), services may not be searched continuously.

Further, when there is a change of the service such as data addition and deletion of the service, deletion of the service and/or addition of a new service, if a client characteristic configuration is not performed, the change of the service may not be indicated through a service Changed indication function.

Further, since the client may not know which function the server may perform in an actual profile, when a specific function may not be performed between the client and the server, there is a problem in that a delay occurs in providing the service by switching to an executable function.

In addition, since there is no method in which the client may acquire information on various procedures implemented for each service, a compatibility problem occurs.

Accordingly, the present invention provides a method for transmitting and receiving, when a length of service information is large, the service information and a method capable of immediately discovering a specific service, in order to solve such a problem.

Further, the present invention proposes a method in which even when services have different UUID lengths, the service may be consecutively discovered and when data of the service is changed, the change in data may be recognized.

Furthermore, the present invention proposes a method for recognizing the function implemented between the client and the server in order to discover the service and the characteristic.

Figure 14:
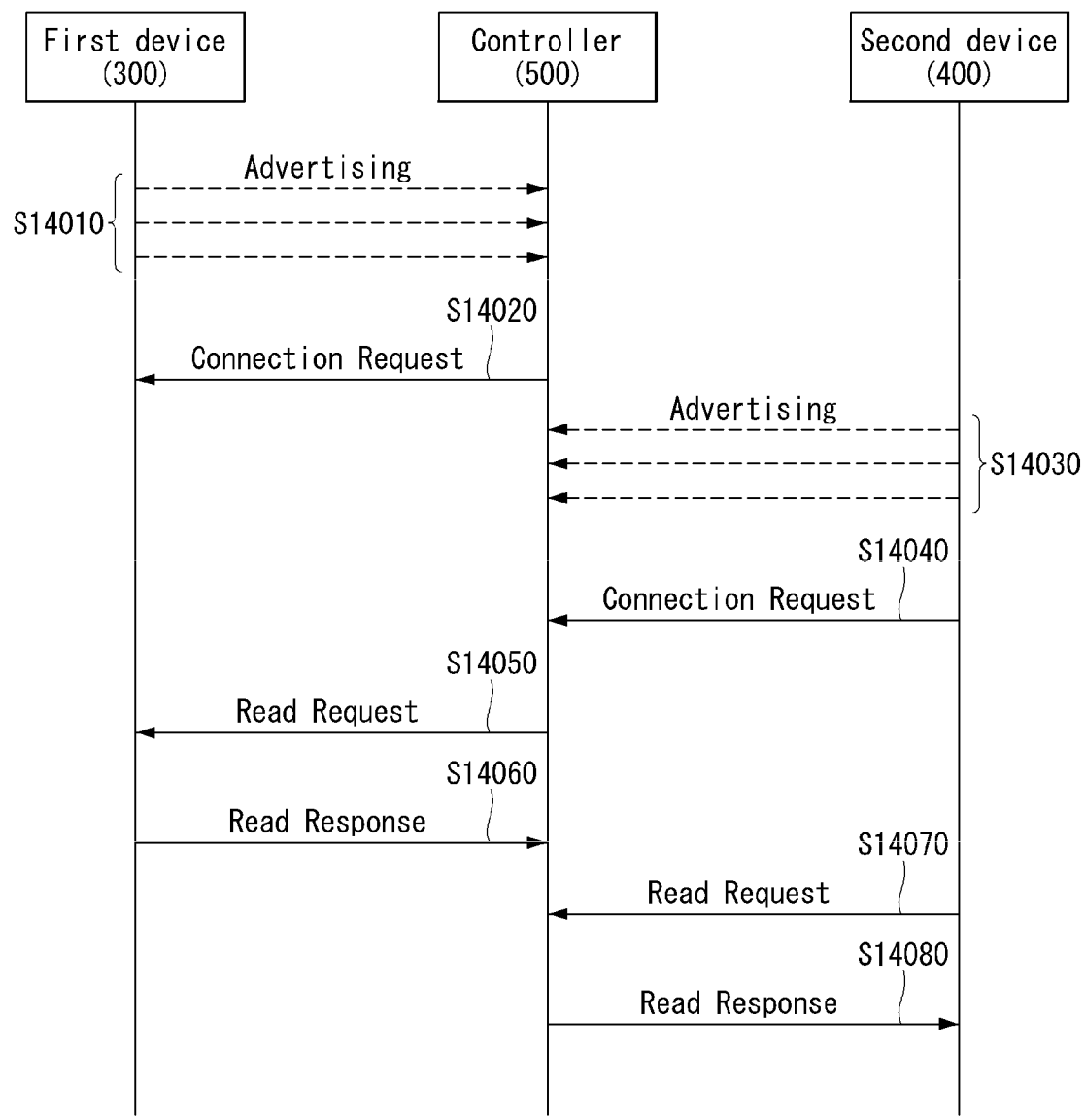
FIG. 14 is a flow diagram illustrating one example of a method for a controller to obtain service information of devices according to the present invention.

FIG. 14 is a flow diagram illustrating one example of a method for a controller to obtain service information of devices according to the present invention.

Referring to FIG. 14, the controller may obtain information of services in which each individual device operates as a client or a server and control devices operating as a client or a server in a specific service to form a connection to each other in the specific service.

More specifically, a first device 300 transmits an advertising message in the advertising channel so that neighboring devices may search for the first device 300, S14010.

At this time, the advertisement message may include information of services that are supported by the first device 300.

If advertising time is provided according to a predetermined setting or is not configured, the first device 300 may transmit an advertising message continuously.

The controller 500 may discover the first device 300 in case the advertising channel receives the advertising message that is transmitted by the first device 300.

If it is found that the first device 300 is the device to which the controller attempts to form a connection (for example, if the first device 300 provides the easy pairing service), the controller 500 which has discovered the first device 300 transmits a connection request message to the first device 300 to form a Bluetooth LE connection to the first device 300, S14020.

Afterwards, the controller 500 may search for a device to form a Bluetooth LE connection to the first device 300.

To search for a device supporting Bluetooth LE, the controller 500 may receive the advertising message transmitted through advertising channels. If receiving an advertising message transmitted through the advertising channel from a second device 400, the controller 500 may discover the second device 400, S14030.

If it is found that the second device 400 is the device to which the controller attempts to form a connection (for example, if the second device 400 provides the easy pairing service), the controller 500 which has discovered the second device 400 transmits a connection request message to the second device 400 to form a Bluetooth LE connection to the second device 400, S14040.

Afterwards, to connect the first device 300 to the second device 400, the controller 500 has to figure out which role each of the two devices performs in a specific service.

In other words, if both of the first 300 and the second device 400 is incapable of performing the role of a client or a server in the specific service, the specific service may not be provided even if the controller 500 connects the first 300 and the second device 400 to each other.

Therefore, the controller 500 transmits to the first device 300 a Read Request message or Read By Type Request message requesting information of characteristics related to at least one service in which the first device 300 performs the role of a client S14050.

In what follows, the characteristic related to at least one service operating as a client according to the present invention is called Client List Characteristic, and the information included in the Client List Characteristic is called Client List Characteristic Information (or first characteristic information).

In case the controller 500 does not know the handle value of the characteristic in the S14050 step, the Read By Type Request message including the UUID of the characteristic is transmitted to the first device 300; in case the controller 500 knows the handle value of the characteristic, a Read Request message including the handle value is transmitted.

At this time, in case the Read By Type message is transmitted, the Read By Type Request message may include the UUID of the characteristic, Starting Handle number from which reading is started, and Ending Handle number at which reading is terminated.

The first device 300 which has received the Read By Type Request message or Read Request message from the controller 500 transmits to the controller 500 a Read By Type Response message or Read Response message including Client List Characteristic information S14060.

At this time, the Read By Type Response message may include a data list of the characteristic and length values of the data.

The controller 500, which has obtained from the first device 300 information of at least one service in which the first device 300 may operate as a client, transmits to the second device 400 a Read Request message or Read By Type Request message to check whether there exist services in which the second device 400 may operate as a server S14070.

In other words, the controller 500 transmits to the second device 400 a Read Request message or Read By Type message requesting information of characteristics related to at least one service in which the second device 400 operates as a server.

In what follows, the characteristic related to at least one service operating as a server according to the present invention is called Server List Characteristic, and the information included in the Server List Characteristic is called Server List Characteristic Information (or second characteristic information).

In case the controller 500 does not know the handle value of the characteristic in the S14070 step, the Read By Type Request message including the UUID of the characteristic is transmitted to the first device 300; in case the controller 500 knows the handle value of the characteristic, a Read Request message including the handle value is transmitted.

At this time, in case the Read By Type message is transmitted, the Read By Type Request message may include the UUID of the characteristic, Starting Handle number from which reading is started, and Ending Handle number at which reading is terminated.

The second device 400 which has received the Read By Type Request message or Read Request message from the controller 500 transmits to the controller 500 a Read By Type Response message or Read Response message including Server List Characteristic information S14080.

At this time, the Read By Type Response message may include a data list of the characteristic and length values of the data.

The controller 500 may obtain information of services in which the first device 300 operates as a client through the S14050 and S14060 steps and information of services in which the second device 400 operates as a server through the S14070 and S14080 steps.

In case the first device 300 operates as a client and the second device operates as a server in a specific service, the controller 500 may connect the first 300 and the second device 400 through a Bluetooth LE connection, and the first 300 and the second device 400 may provide the specific service after the Bluetooth LE connection is formed.

By using the method described above, the controller 500 may obtain information of services in which a device performs a specific role and control a connection to be formed according to the roles of the respective devices on the basis of the obtained service information.

FIGS. 15 to 17 illustrate one example of characteristics related to a service wherein a device operates as a client according to the present invention.

Referring to FIGS. 15 to 17, the Client List characteristic described in FIG. 14 includes information of each service according to the number of bits comprising the UUID.

More specifically, the Client List characteristic may provide list information of all of the client functions that a device provides. For example, the Client List characteristic may provide information about the functions defined as a primary service and information about the functions defined as an Included service.

The controller 500 may check the client function that a device provides by reading the Client List characteristic through the Read Request message.

Also, a device system has to write the Client List characteristic, and an external device (for example, an unauthenticated device) is not allowed to write the Client List characteristic values.

The 16 bit UUID list field, 32 bit UUID list field, and 128 bit UUID list field of the Client List characteristic may provide information continuously in their default units of 16, 32, and 128 bits, respectively.

The Client List characteristic may be provided as the characteristic of the easy pairing service or as the default characteristic of the GATT profile.

If the controller 500 uses the Read Request By UUID procedure, a data request may be immediately issued without involving Characteristic Discovery.

As shown in FIG. 15, the Client List characteristic may include the following fields.

Client List Information: UUID information of a service operating as a client included in the characteristic
  Num Of 16 bit UUID List: the number of 16 bit UUID information
  16 bit UUID List: list of 16 bit UUID information
  Num Of 32 bit UUID List: the number of 32 bit UUID information 32 bit UUID List: list of 32 bit UUID information Num Of 128 bit UUID List: the number of 128 bit UUID information 128 bit UUID List: list of 128 bit UUID information The Client List characteristic shown in FIG. 15 includes all of the information of services in which a device operates as a client according to the bit format defined for the respective fields.

FIG. 16 illustrates one example of a Client List characteristic different from that of FIG. 15.

As shown in FIG. 16, the Client List characteristic may be composed to have a different characteristic according to the number of bits employed.

In other words, information of services having a UUID value in 16 bits may be composed as one characteristic, information of services having a UUID value in 32 bits may form another characteristic, and information of services having a UUID value in 128 bits may form a yet another characteristic.

If the characteristics of FIG. 16 are used, characteristic values may be read separately according to their bit formats, leading to reduction of the size of the related message.

The structure of the characteristic shown in FIG. 16 may be used for the structure of the Server List characteristic illustrated in FIG. 14.

FIG. 17 illustrates one example of Client List Information included in the Client List characteristic of FIG. 15.

The Client List Information provides UUID information of a service operating as a client, which is included in the characteristic as described above. In other words, the Client List Information indicates existence of the UUIDs in the respective bit formats.

The 0-th bit of FIG. 17(a) indicates existence of the 16 bit UUID, 1st bit indicates existence of the 32 bit UUID, and 2nd bit indicates existence of the 128 bit UUID.

For example, in case the 0-th bit of FIG. 17(a) is 1, 16 bit UUID information exists, and Num of 16 bit UUID List and 16 bit UUID List fields exist. However, if the 0-th bit is 0, the 16 bit UUID information does not exist, and the Client List characteristic does not include the Num of 16 bit UUID List and 16 bit UUID List fields.

Similarly, in case the 1st bit 1, 32 bit UUID information exists, and Num of 32 bit UUID List and 32 bit UUID List fields exist. However, if the 1st bit is 0, the 32 bit UUID information does not exist, and the Client List characteristic does not include the Num of 32 bit UUID List and 32 bit UUID List fields.

Likewise, in case the 2nd bit 1, 128 bit UUID information exists, and Num of 128 bit UUID List and 128 bit UUID List fields exist. However, if the 2nd bit is 0, the 128 bit UUID information does not exist, and the Client List characteristic does not include the Num of 128 bit UUID List and 128 bit UUID List fields.

FIG. 17(b) illustrates another structure of the Client List Information field.

Each bit shown in FIG. 17(b) is defined as follows.

0-th bit: in case it is 1, 16 bit UUID information exists, and the Client List characteristic includes Num of 16 bit UUID List and 16 bit UUID List fields. However, if the 0-th bit is 0, the 16 bit UUID information does not exist, and the Client List characteristic does not include the Num of 16 bit UUID List and 16 bit UUID List fields.

1st bit: in case it is 1, 32 bit UUID information exists, and the Client List characteristic includes Num of 32 bit UUID List and 32 bit UUID List fields. However, if the 1st bit is 0, the 32 bit UUID information does not exist, and the Client List characteristic does not include the Num of 32 bit UUID List and 32 bit UUID List fields.

2nd bit: in case it is 1, 128 bit UUID information exists, and the Client List characteristic includes Num of 128 bit UUID List and 128 bit UUID List fields. However, if the 2nd bit is 0, the 128 bit UUID information does not exist, and the Client List characteristic does not include the Num of 128 bit UUID List and 128 bit UUID List fields.

5th bit: in case it is 1, it indicates that 16 bit UUID exists, but list information of the entire services is not provided. Therefore, information of services to which 16 bit UUIDs are allocated may be obtained by requesting additional information.

6th bit: in case it is 1, it indicates that 32 bit UUID exists, but list information of the entire services is not provided. Therefore, information of services to which 32 bit UUIDs are allocated may be obtained by requesting additional information.

7th bit: in case it is 1, it indicates that 128 bit UUID exists, but list information of the entire services is not provided. Therefore, information of services to which 128 bit UUIDs are allocated may be obtained by requesting additional information.

FIG. 17(c) illustrates a yet another structure of the Client List Information field.

Each bit shown in FIG. 17(c) is defined as follows.

16 bit UUID List:

0b00: 16 bit UUID List information does not exist

0b01: complete 16 bit UUID information is provided

0b10: incomplete 16 bit UUID information is provided. In case additional information is requested, additional information may be provided.

0b11: incomplete 16 bit UUID information is provided, but additional information is not provided 32 bit UUID List:

0b00: 32 bit UUID List information does not exist

0b01: complete 32 bit UUID information is provided

0b10: incomplete 32 bit UUID information is provided. In case additional information is requested, additional information may be provided.

0b11: incomplete 32 bit UUID information is provided, but additional information is not provided 128 bit UUID List:

0b00: 128 bit UUID List information does not exist

0b01: complete 128 bit UUID information is provided

0b10: incomplete 128 bit UUID information is provided. In case additional information is requested, additional information may be provided.

0b11: incomplete 128 bit UUID information is provided, but additional information is not provided FIG. 18 illustrates one example of characteristic related to a service wherein a device operates as a server according to the present invention.

FIG. 18(a) illustrates one example of a Server List characteristic related to at least one service in which the device described with reference to FIG. 14 operates as a server, and FIG. 18(b) illustrates one example of a field included in the Server List characteristic.

Referring to FIG. 18(a), the Server List characteristic described with reference to FIG. 14 includes information of each service according to the bit format of UUID.

More specifically, the Server List characteristic may provide list information of all of the server functions that a device provides. For example, the Server List characteristic may provide information about the functions defined as a primary service and information about the functions defined as an Included service.

The controller 500 may check the server function that a device provides by reading the Server List characteristic through the Read Request message.

Also, a device system has to write the Server List characteristic, and an external device (for example, an unauthenticated device) is not allowed to write the Server List characteristic values.

The 16 bit UUID list field, 32 bit UUID list field, and 128 bit UUID list field of the Server List characteristic may provide information continuously in their default units of 16, 32, and 128 bits, respectively.

The Server List characteristic may be provided as the characteristic of the easy pairing service or as the default characteristic of the GATT profile.

If the controller 500 uses the Read Request By UUID procedure, a data request may be immediately issued without involving Characteristic Discovery.

As shown in FIG. 18(a), the Server List characteristic may include the following fields.

Server List Information: UUID information of a service operating as a server included in the characteristic Num Of 16 bit UUID List: the number of 16 bit UUID information Num Of 32 bit UUID List: the number of 32 bit UUID information 32 bit UUID List: list of 32 bit UUID information Num Of 128 bit UUID List: the number of 128 bit UUID information 128 bit UUID List: list of 128 bit UUID information The Server List characteristic shown in FIG. 18(a) includes all of the information of services in which a device operates as a client according to the bit format defined for the respective fields.

In another embodiment of the present invention, in addition to the structure shown in FIG. 18(a), the Server List characteristic may be composed to have a different characteristic according to the number of bits employed as shown in FIG. 16.

FIG. 18(b) illustrates one example of Server List Information included in the Server List characteristic shown in FIG. 18(a).

The Server List Information provides UUID information of a service operating as a server, which is included in the characteristic as described above. In other words, the Server List Information indicates existence of the UUIDs in the respective bit formats.

The 0-th bit of FIG. 18(b) indicates existence of the 16 bit UUID, 1st bit indicates existence of the 32 bit UUID, and 2nd bit indicates existence of the 128 bit UUID.

For example, in case the 0-th bit of FIG. 18(b) is 1, 16 bit UUID information exists, and Num of 16 bit UUID List and 16 bit UUID List fields exist. However, if the 0-th bit is 0, the 16 bit UUID information does not exist, and the client List characteristic does not include the Num of 16 bit UUID List and 16 bit UUID List fields.

Similarly, in case the 1st bit 1, 32 bit UUID information exists, and Num of 32 bit UUID List and 32 bit UUID List fields exist. However, if the 1st bit is 0, the 32 bit UUID information does not exist, and the client List characteristic does not include the Num of 32 bit UUID List and 32 bit UUID List fields.

Likewise, in case the 2nd bit 1, 128 bit UUID information exists, and Num of 128 bit UUID List and 128 bit UUID List fields exist. However, if the 2nd bit is 0, the 128 bit UUID information does not exist, and the client List characteristic does not include the Num of 128 bit UUID List and 128 bit UUID List fields.

Also, in another embodiment of the present invention, Server List Information may have the same structure as that of FIG. 17(b) or (c).

FIG. 19 illustrates one example of a method for transmitting and receiving specific information through a plurality of messages if the specific information exceeds a predetermined size according to the present invention.

Referring to FIG. 19, in case the length of specific information is longer than a predetermined length, the specific information may be transmitted after being divided by a predetermined length.

First, the S19010 and S19020 steps are the same as the S14010 and S14020 steps, descriptions thereof will be omitted.

The controller 500, which has formed a Bluetooth LE connection to the first device 300, transmits to the first device 300 a Read By Type Request message or Read Request Message requesting information of the Client List characteristic related to at least one service in which the first device 300 operates as a client S19030.

In case the controller 500 transmits a Read By Type message, the Read By Type Request message may include UUID of the Client List characteristic.

If the length of information of the Client List characteristic is longer than a predetermined length (for example, in case the length is longer than the length that a message may accommodate), the first device 300 is unable to transmit the information of the Client List characteristic to the controller 500 by including the information in the Read By Type Response message.

Therefore, the first device 300 transmits to the controller 500 error information describing the cause of not being able to transmit the characteristic information to the controller 500 and an error response message including the handle information of the Client List characteristic S19040.

At this time, the error information may indicate that the length of the characteristic information is longer than a predetermined length and thus the characteristic information may not be transmitted through the Read By Type Response message.

To receive the information of the Client List characteristic in parts formed by dividing the characteristic information by a predetermined length, the controller 500 transmits handle information included in the error message and a Read Blob Request message including an offset to the first device 300, S19050.

At this time, the first offset value included in the Read Blob Request message is 0.

The first device 300 includes data of the handle information requested through the Read Blob Request message in the Read Blob Response message. The data of the handle information starts from the offset position in the Read Blob Response message. The first device 300 then transmits the Read Blob Response message to the controller 500, S19060.

At this time, the length of information that the first device 300 may transmit through the Read Blob Response message is the same as the ATT_MTU value.

Afterwards, the controller 500 transmits a Read Blob Request message to the first device 300 to request additionally the information to receive the remaining information S19070.

At this time, the offset included in the Read Blob Request message transmitted at the S19070 step represents the position of data to receive by taking into account the length of information that the controller 500 actually receives (for example, in case the controller 500 receives 50 bytes, the offset becomes 51).

The first device 300 transmits the Read Blob Response message to the controller 500. The Read Blob Response message includes the information, the length of which is indicated by ATT_MTU. The offset value specifies the start position of the information in the Read Blob Response message S19080.

By using the method described above, the controller 500 may receive characteristic information over several transmissions even if the size of the characteristic information is larger than a predetermined value.

FIGS. 20 and 21 illustrate one example of a characteristic related to a service structure according to the present invention.

Referring to FIGS. 20 and 21, a device obtains information of a characteristic representing the structure of services that the other device may provide. From the obtained information, the device may obtain information of primary services of the other device and information of Included services related to the primary services.

In what follows, the characteristic representing the structure of services is called Structure Information characteristic.

More specifically, the Structure Information characteristic may include structure information of all of the services that a device may provide.

The controller 500 transmits a Read Request message to the first 300 or second device 400. And the controller 500 may obtain characteristic information (second characteristic information) of the Structure Information characteristic included in the Read Response message transmitted from the first 300 or second device 400.

The controller 500 may check at once the client function or server function that the first 300 or second device 400 may provide through the information of the Structure Information characteristic obtained from the first 300 or second device 400.

A device system has to write the Structure Information characteristic, and an external device (for example, an unauthenticated device) is not allowed to write the Structure Information characteristic values.

As shown in FIG. 20(a), the Structure Information characteristic may include the following fields.

# of Primary Service: the number of Primary Services
Length of Primary Service: a field representing the length of a Primary Service. This field represents the length of information ranging from Primary Service1 Type to a plurality of Included services as shown below.
  Information of one Primary Service (Primary Service1 Type, Primary Service1 UUID, Start handle, End Handle)
  Information of a plurality of Included Services (Length of Included Service, Included Service1 type, Included Service UUID, Start Handle, End Handle)
  In the case of multiple pieces of information about Included Services, the corresponding information is repeated.
Primary Service Type: UUID type of Primary Service.
Primary Service UUID: UUID of Primary Service (16 bit/32 bit/128 bits).
Start Handle of Primary Service1: start handle of Primary Service
End Handle of Primary Service1: end handle of Primary Service Length of Included Service1: represents the length of Included Service, indicating the length extending from Included Service Type to End handle.
Included Service1 Type: UUID type of Included Service 1.
Included Service UUID: UUID (16 bit/32 bit/128 bits) of Included Service
Start Handle of Included Service: start handle of Included Service
End Handle of Included Service1: end handle of Included Service1

In case the value of # of Primary Service is larger than 1, the fields ranging from the Length of Primary Service field of FIG. 19 to the End Handle of Included Service field may be repeated as many times as the value of # of Primary Service.

FIG. 21 illustrates one example of the Structure Information characteristic in case the value of # of Primary Service is 2 (two primary services are provided).

FIG. 20(b) illustrates one example of Primary Service Type field or Included Service Type field of the Structure Information characteristic.

Each bit in FIG. 20(b) is defined as follows.

7th bit: service type indicating whether a service is Primary service or Included service. For example, 0b0 indicates a Primary service, while 0b1 indicates an Included service.

6th bit: indicates a change in the information of a service, the type of which is determined from the 7th bit. For example, 0b0 indicates that no change has occurred, while 0b1 indicates existence of a change.

1st bit and 0th bit: indicates the number of bits for the UUID of a service, the type of which is determined from the 7th bit. For example, 0b10 indicates a list of 128 bit UUIDs, 0b01 indicates a list of 32 bit UUIDs, and 0b00 indicates a list of 16 bit UUIDs.

By reading the 7th and 6th bit, the controller or client may know which service information has changed and may read again only the service information that has changed.

For example, in case the 7th bit is 0b0, and the 6th bit is 0b1, the controller 500 or client may know that the primary service information has changed and may obtain the changed information by reading the information of the corresponding service again from the start handle to the end handle.

In another embodiment of the present invention, from the hash value of each characteristic, the controller 500 or client may know that the corresponding characteristic value has changed.

For example, in case the hash value of a specific characteristic increases or decreases, the controller 500 or client may recognize that the information of the specific characteristic has changed. By reading the information of the corresponding characteristic again, the controller 500 or client may obtain the changed information.

By using the method described above, in case only the information of a specific service is changed, the changed service information may be figured out without going through the service discovery procedure again from the start, thereby avoiding unnecessarily performing the procedure again.

FIG. 22 is a flow diagram illustrating one example of a method for transmitting and receiving information of a changed service in case information related to a service changes according to the present invention.

Referring to FIG. 22, in case information of a specific service is changed, a device may recognize the information change of the specific service by reading the characteristic representing the information. The device may request and receive the information of the changed service.

First, since the S22010 and S22020 steps are the same as the S14010 and S14020 steps of FIG. 14, descriptions thereof will be omitted.

The controller 500 forms a Bluetooth LE connection to the first device 300. To know the structure of all of the services in which the first device 300 operates as a client, the controller 500 transmits a Read By Type Request message to the first device 300, S22030. The controller 500 uses the Read By Type Request message to request reading of the Structure Information characteristic that represents the structure of the services described with reference to FIG. 20.

At this time, the Read By Type Request message may include the UUID of the Structure Information characteristic.

In case the information of the Structure Information characteristic may be transmitted through the Read By Type Response message, the first device 300 transmits the Read By Type Response message including the information of the Structure Information characteristic to the controller 500, S22040.

However, in case the information of the Structure Information characteristic may not be transmitted through the Read By Type Response message, the information of the Structure Information characteristic may be transmitted to the controller 500 by using the method described with reference to FIG. 19.

The controller 500, which has received the characteristic information from the first device 300, may recognize whether the information of the Primary service or Included service of the first device 300 has changed through the Service Type field described with reference to FIG. 20(*b*) S22050.

If the Service Type field indicates that information of a specific service has changed, the controller 500 may transmit the Read Blob Request message to the first device 300 to request information of the changed service S22060.

At this time, the Read Blob Request message may include the handle value of the changed characteristic and the offset value representing the position of the changed data.

The first device 300 transmits the data of the changed characteristic to the controller 500 through the Read Blob Response message S22060. ATT_MTU specifies the length of the data, and the offset specifies the start position of the data in the Read Blob Response message.

By using the method above, the controller 500 may recognize which service information has changed and may receive only the changed data.

FIG. 23 is a flow diagram illustrating a method for transmitting and receiving additional information through a plurality of messages in case characteristic information may provide additional information according to the present invention.

Referring to FIG. 23, in the presence of additional information in the characteristic information of the server, the controller 500 or client may transmit a message requesting additional information and obtain the additional information.

First, since the S23010 and S23020 steps are the same as the S14010 and S14020 steps, descriptions thereof will be omitted.

Afterwards, the controller 500, which has formed a Bluetooth LE connection to the first device 300, transmits to the first device 300 a Read By Type Request message or Read Request Message requesting information of the Client List characteristic related to at least one service in which the first device 300 operates as a client S23030.

The first device 300 transmits a Read By Type Response message including information of the Client List characteristic to the controller 500, S23040.

At this time, if the structure of the Client List Information of the Client List characteristic is the same as that of FIG. 17(*c*), the controller 500 may recognize existence of additional information through the Client List Information field.

If each UUID List is 0b01 or 0b11, the controller 500 determines that the first device 300 is incapable of providing additional information and terminates the procedure.

However, if the UUID List is 0b11, the controller 500 determines that the first device 300 has transmitted incomplete information.

In other words, the controller 500 determines that the first device 300 has transmitted only part of the Client List characteristic and is capable of transmitting additional information of the Client List characteristic S23050.

The controller 500, which has recognized existence of additional information and the first device's capability of transmitting the additional information, may transmit a Read By Type Request message requesting additional information to the first device 300 and receive a Read By Type Response message including the additional information from the first device 300, S23060, S23070.

At this time, the controller 500 may request the additional information by including the UUID value of the corresponding characteristic in the Read By Type Request message and transmitting the Read By Type Request message.

Also, the Read By Type Response message may include the length and data of the attribute having the UUID included in the Read By Type Request message.

By using the method described above, the controller 500 may determine existence of additional information in a specific characteristic and the first device's capability of providing the additional information and may receive the additional information.

FIG. 24 is a flow diagram illustrating one example of a method for transmitting and receiving changed characteristic information in case characteristic information is changed according to the present invention.

Referring to FIG. 24, in case characteristic information of a device is changed, the device may read a specific characteristic, recognize whether the characteristic information has changed, and obtain changed characteristic information.

First, since the S24010 and S24020 are the same as the S14010 and S14020 of FIG. 14, descriptions thereof will be omitted.

The controller 500, which has formed a Bluetooth LE connection to the first device 300, transmits to the first device 300 a Read By Type Request message requesting characteristic information related to change of characteristic values to check whether the characteristic values of the first device 300 have changed S24030.

In what follows, the characteristic related to a change of characteristic value according to the present invention is called Changed Characteristic list Characteristic, and information included in the Changed Characteristic list Characteristic is called Changed Characteristic list Characteristic Information.

At this time, a Read By Type Request message may include the UUID of the Changed Characteristic list Characteristic.

The first device 300 transmits to the controller 500 a Read By Type Response message including the length and data of the attribute to which the UUID of the Changed Characteristic list Characteristic is allocated S24040.

The controller 500 may determine whether there is a changed characteristic from among the characteristics of the first device 300 through the value of the Changed Characteristic list Characteristic S24050.

If there is a changed characteristic, the controller 500 transmits a Read Request message requesting the value of the changed characteristic to the first device 300, S24060.

At this time, the Read Request message may include the handle information of the changed characteristic.

The first device 300 transmits to the controller 500 a Read Response message including the value of the characteristic to which a UUID requested by the controller 500 is allocated S24070.

By using the method described above, the controller 500 may recognize a change of a characteristic of the first device 300 and receive the changed characteristic value.

If more than one characteristic values have changed, the controller 500 may perform the S24060 and S24070 steps repeatedly to receive a plurality of changed characteristic values.

In the present embodiment, characteristics are public characteristics and may employ specific handle values.

Also, in the case of public characteristic, by performing the Read Long Characteristic Value procedure without involving the characteristic discovery procedure, the controller may request information easily.

FIGS. 25 and 26 illustrate one example of characteristics related to change of characteristic information according to the present invention.

Referring to FIGS. 25 and 26, the Changed Characteristic list Characteristic described with reference to FIG. 24 may include information related to the characteristic changed in a device.

More specifically, in case the Changed Characteristic list Characteristic includes changes of characteristics of all of the changed services in a specific device, the device may include only one Changed Characteristic list Characteristic.

However, in case the Changed Characteristic list Characteristic provides changed characteristics of the respective services, the Changed Characteristic list Characteristic may exist for each service.

If the client reads the Changed Characteristic list Characteristic, the client may know the changed characteristic information in the server and read the information of the changed characteristic selectively.

Therefore, a client reconnecting to a server may read changed information of a characteristic without performing the characteristic discovery again, thereby reducing connection and data transmission time.

The information of the corresponding characteristic has to be written for each device or service, and an external device (for example, an unauthenticated device) is not allowed to write the Structure Information Characteristic values.

FIG. 25(*a*) illustrates one example of the structure of the Changed Characteristic list Characteristic.

As shown in FIG. 25(*a*), the Changed Characteristic list Characteristic may include the following fields.

Number Of Changed Characteristic: the number of changed characteristics

Handle of Characteristic: handle value (position value) of a characteristic, information of which has changed Changed Contents: changed contents of a characteristic If the value of Number Of Changed Characteristic field is larger than one, Handle of Characteristic field and Changed Contents field are repeated as many times as the value of the Number Of Changed Characteristic field.

FIG. 25(*b*) illustrates one example of Changed Contents field of FIG. 25(*a*).

If the 0th bit of the Changed Contents field is '1', it indicates that the value of a characteristic has been changed, while, if the 0th bit is '0', it indicates that the value of the characteristic remains the same.

If the 1st bit is '1', it indicates that the declaration part of the characteristic has been changed, while, if the 1st bit is '0', it indicates that the declaration part remains the same as before.

The Changed Method field indicates addition, removal, or change of a characteristic. For example, each bit of the Changed Method field may be defined as follows.

0b00: Added (it indicates that a new characteristic has been generated. Both of the 0th and 1st bit must have a value of '0'. Also, the client has to newly read the corresponding value from the server.)

0b01: Deleted (it indicates that an existing characteristic has been deleted. Both of the 0th and 1st bit must have a value of '0'. Also, the client has to delete the stored value of the characteristic.)

0b10: Modified (it indicates that an existing characteristic has been modified. According to the value of the 0th or 1st bit, it indicates that the corresponding value or declaration part has been modified. The client has to newly read the modified value from the server.)

FIG. 26(*a*) illustrates another example of a structure of Changed Characteristic list Characteristic.

As shown in FIG. 26(*a*), the Changed Characteristic list Characteristic may include the following fields.

Number Of Changed Characteristic: the number of changed characteristics

UUID type: UUID type of a characteristic. It defines the UUID type of a characteristic included in the next field (for example, 01 indicates a 16 bit UUID, 02 indicates a 32 bit UUID, and 03 indicates a 128 bit UUID).

UUID of Characteristic: UUID of a modified characteristic

Changed Contents: changed contents of a characteristic

If the value of Number Of Changed Characteristic field is larger than one, UUID type field, UUID of Characteristic field, and Changed Contents field are repeated as many times as the value of the Number Of Changed Characteristic field.

FIG. 26(*b*) illustrates one example of the Changed Contents field of FIG. 26(*a*), and descriptions thereof will be omitted since this example is the same as that of FIG. 25(*b*).

Although the method described in FIGS. 19 to 26 has been described with respect to the embodiments employing the controller 500 and the first device 300 operating as a client, the method may also be applied to the case employing the controller 500 and the second device 400 operating as a server.

Figure 27:
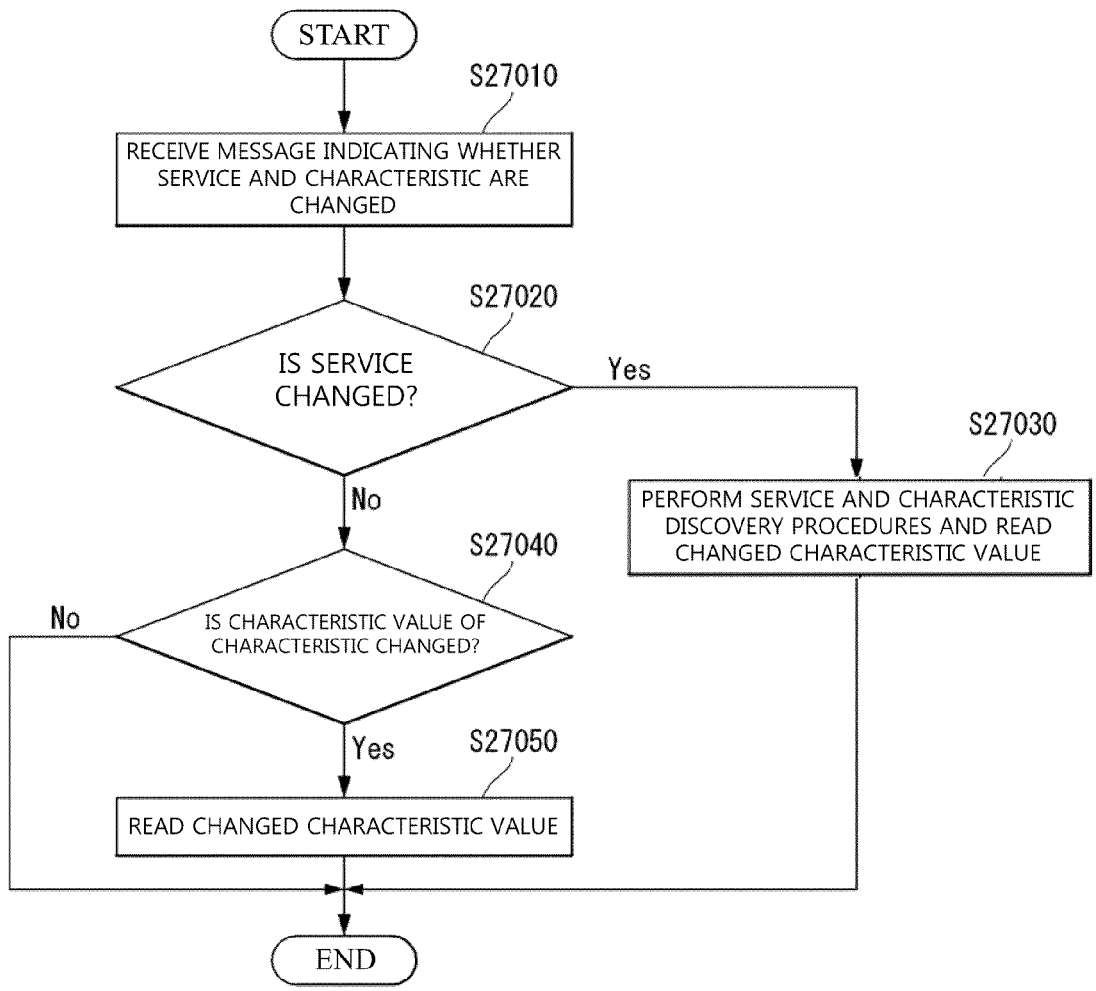

FIGS. 27 and 28 are diagrams illustrating one example of a method for recognizing whether services and characteristics are changed and a data format according to the present invention.

Referring to FIGS. 27 and 28, a client, which is a control device for controlling devices, may recognize and search a service and a characteristic of a server, which is a controlled device, when the service and the characteristic are changed.

Specifically, when service information of the server is changed or data of the service is changed, the client searches all services through service search and characteristic search procedures.

However, even when the service is not changed and only the data of the service is changed, it is inefficient to search all of the services again. Therefore, the client may receive information indicating each of a change in service and a change in data from the server and search only the changed service and/or data according to the received information.

Specifically, when the service of the server and the data of the service are changed, a specific characteristic of the server may include characteristic values representing the changed service and data.

Hereinafter, characteristics representing whether the service of the server and the data of the service are changed are referred to as changed information characteristics.

The changed information characteristics may include a service modification field and a characteristic value modification field as illustrated in FIG. 28.

The service modification field as a field representing whether the service of the server is changed represents addition of a new service, deletion of an existing service, and addition and deletion of new characteristics of the service.

That is, when a value of the service modification field is changed, the client may recognize that the service of the server is changed.

The characteristic value modification as a field representing whether the data of the service is changed represents the change in characteristic value related to the service without changing the service.

That is, when the value of the characteristic value modification field is changed, the client may recognize that the value of the characteristic related to a specific service is changed.

When the service of the server and/or the value of the characteristic related to the service are/is changed, the client may receive, from the server, a message including the characteristic value of the changed information characteristic.

In this case, the client may transmit a read request message for requesting the characteristic value of the Changed information characteristic to the server and receive a read response message including the characteristic value of the Changed information characteristic in response thereto.

Alternatively, when the service and/or the value of the characteristic are/is changed, the server may transmit, to the client, an indication message including the characteristic value of the Changed information characteristic.

The client receiving the characteristic value of the Changed information characteristic from the server determines whether the service of the server is changed based on the received characteristic value (S27020).

When the service is changed, the client may perform a service search procedure and a characteristic search procedure in order to search the changed service of the server and when there is a characteristic whose property value is changed, the client may perform a read process to obtain the changed characteristic value.

However, when the service is not changed, the client determines whether the value of the characteristic related to the service of the server is changed (S27040).

When the value of the characteristic is changed, the client reads the value of the changed characteristic to obtain the characteristic value and when the characteristic value is not changed, the client does not perform the search procedure and the read procedure.

In another embodiment of the present invention, the message transmitted in step S27010 may include hash values indicating the service and the characteristic.

Specifically, the client may receive a message including a first hash value representing the service of the server and a second hash value representing the characteristic related to the service.

The client may determine whether the service and the characteristic of the server are changed based on the first hash value and the second hash value and when the service and the characteristic are changed, the client may perform a procedure of searching the changed service and/or the changed characteristic.

For example, when the first hash value is different from the existing value, the client may recognize that the service of the server represented by the first hash value is changed. In this case, the client performs a procedure for searching the changed service of the server to search whether the service represented by the first hash value is added, deleted, or changed.

For example, when the second hash value is different from the existing value, the client may recognize that the characteristic represented by the second hash value is changed. In this case, the client may perform the characteristic search procedure in order to search the changed characteristic and obtain the value of the changed characteristic through the read procedure.

Using such a method, the client may obtain the value of the changed characteristic without searching the entire service when only the value of the characteristic is changed without changing the service of the server, thereby reducing the delay of the search procedure.

FIGS. 29 to 31 are diagrams illustrating one example of an attribute for recognizing whether services and characteristics are changed and a data format according to the present invention.

Referring to FIGS. 29 to 31, a field representing whether the service and the value of the characteristic are changed may be added to an attribute to determine whether the service and the value of the characteristic are changed.

In Bluetooth, the service is a specific function or a collection of data and related operations for performing the function. In GATT, the service may be defined by a service definition, and the service definition may include a referred service, a required characteristic, and an optional characteristic.

As the service, there are two types of services: a primary service and a secondary service. The primary service may be a service that provides a function that may be basically used in a device and may be included in other services.

The primary service may be discovered through a primary service discovery procedure. The secondary service is a service referenced by the primary service or other secondary services.

Included service is a method for referencing another service defined in the server in the defined service.

Include definition may be used at a beginning part of the service definition to include another service. When Service definition refers to included service by using include definition, the entirety of included service definition may become a part of a new service definition.

All characteristics of included service and included service are included the entirety of included service definition.

Included service may exist as an independent service and includes a service included in another service or not changed by the included service.

The value of the characteristic is a value used in the service together with attribute and configuration information together with information on a method in which an accessed method and an accessed method are represented or expressed.

In the GATT, the characteristic is defined by a characteristic definition and the characteristic definition may include a characteristic declaration, a characteristic characteristic, and a value and may include a descriptor for describing the value or an allowed configuration of the server in relation to the characteristic.

FIG. 29(a) illustrates a service definition representing the service of the server.

The Service Definition should include service declaration and may include included definition representing included service (or secondary service) which is a service included the primary service and characteristic definition representing a characteristic including data related to the service.

The Service Definition is terminated before next service declaration or after a maximum property handle value is reached.

The Service Definition is displayed on the server based on an attribute handle.

All include definitions and characteristic definitions included in the Service Definition may be considered a part of the service and all included definitions should be positioned before the characteristic definition just after the service declaration.

The service definition may include 0 or more include definitions. All characteristic definitions may be positioned immediately after a last include definition following the service declaration, or the included service may not be present. The service definition may have 0 or more characteristic definitions, and there is no limit in the include definition or the characteristic definition.

An attribute type of the service declaration is an attribute configured to UUID of <<basic service>> or <<subsidiary service>>. The attribute value is 16-bit Bluetooth UUID or 128-bit UUID of a service known as the UUID.

The client should support both the 16-bit and 128-bit UUIDs. The client may disregard a service definition with service UUID which may not be known. The service UUID which may not be known is UUID of a service which is not supported. An attribute authority should be read-only does not require authentication or authorization. In this case, as illustrated in FIG. 29(b), when the service is changed, the Service Definition may include a specific field for indicating the change of the service.

Hereinafter, such a field will be referred to as a modified field.

For example, when a value of the modified field is '0', the value may represent that the service is not changed and when the value of the modified field is '1' or a changed value (1 is added or the value of the modified field is changed to a predetermined value), the value may represent that the service is changed.

FIG. 30(a) illustrates one example of the included definition and FIG. 30(b) illustrates one example of, when the included service is changed, the include definition to which modified field for representing that the included service is changed is added.

When the value of the modified field is changed in FIG. 30(b) as illustrated in FIG. 29(b), the client may recognize that the secondary service or the included service of the server is changed.

FIG. 31(a) illustrates one example of the characteristic definition and FIG. 31(b) illustrates one example of, when the characteristic service is changed, the characteristic definition to which the modified field for representing that the characteristic service is changed is added.

When the value of the modified field is changed in FIG. 31(b) as illustrated in FIG. 29(b), the client may recognize that the characteristic value of the characteristic related to the service of the server is changed.

Figure 32:
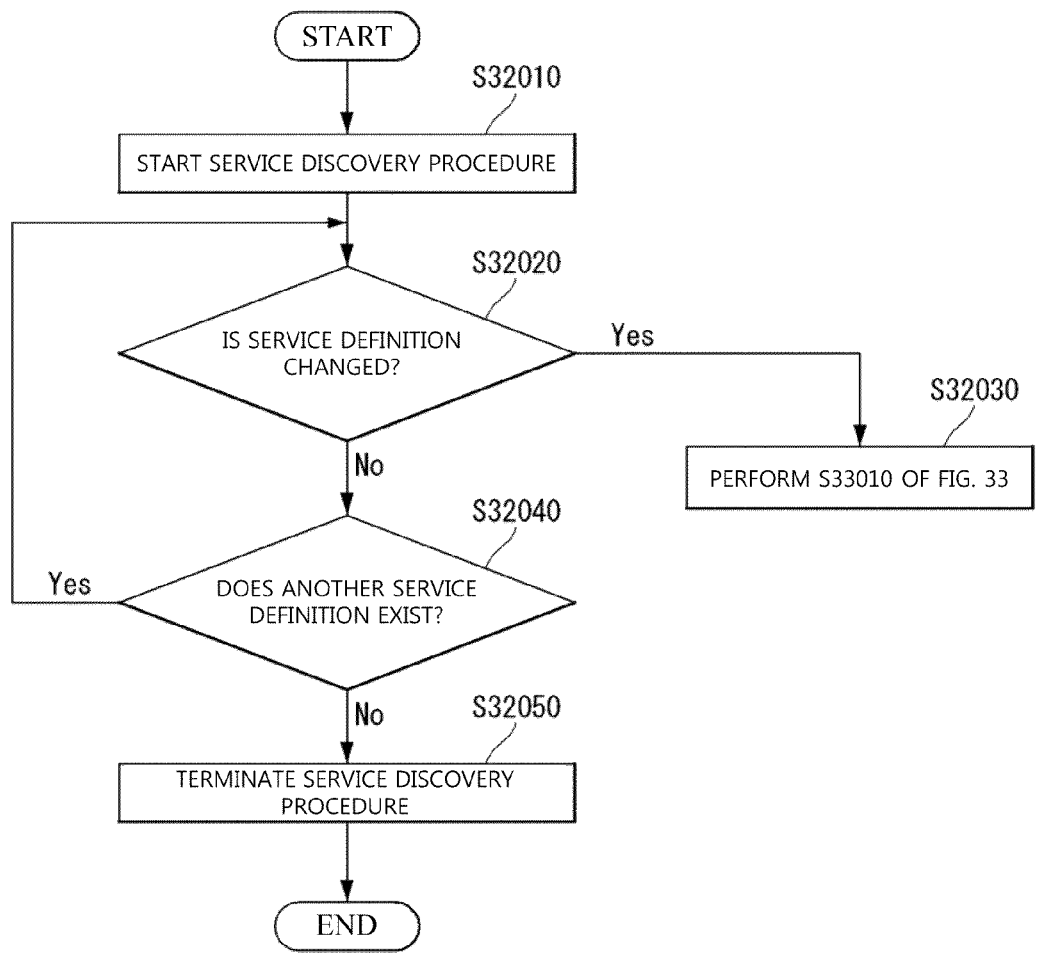
FIGS. 32 to 34 are diagrams illustrating one example of a method for recognizing whether services and characteristics are changed through an attribute according to the present invention.
Figure 33:
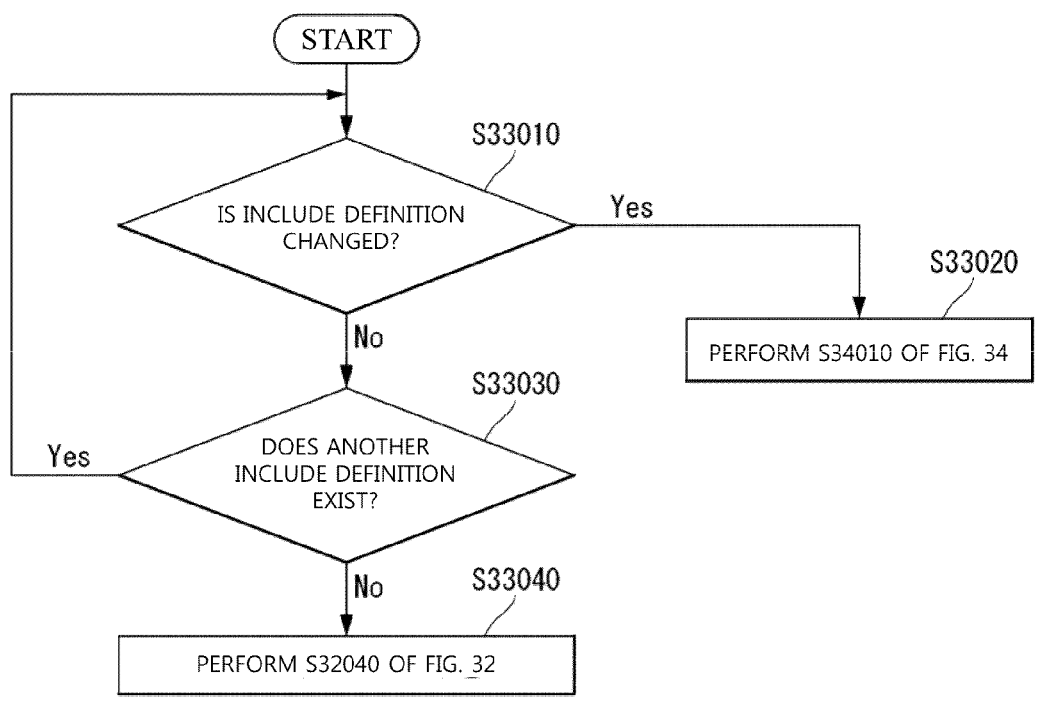
Figure 34:
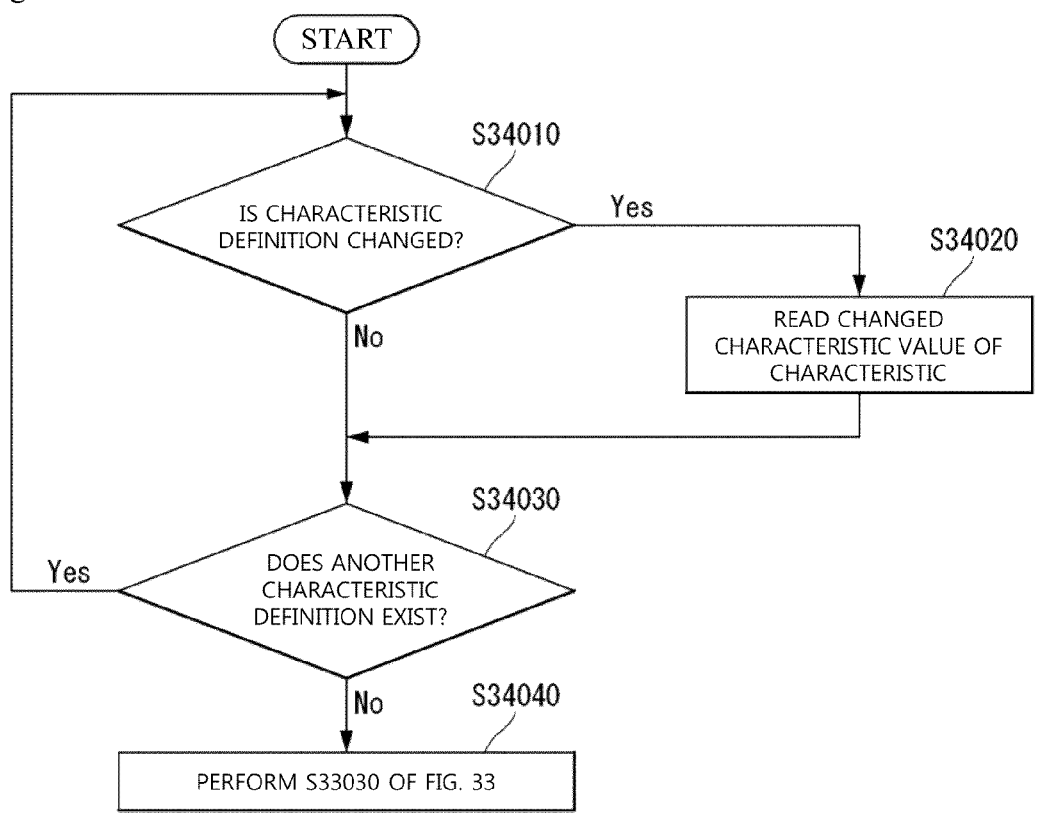

FIGS. 32 to 34 are diagrams illustrating one example of a method for recognizing whether services and characteristics are changed through an attribute according to the present invention.

Referring to FIGS. 32 to 34, the client may recognize whether the service of the server is changed through the service definition, the include definition, and the characteristic definition of the server.

FIG. 32 illustrates a method for searching whether the service definition representing the service of the server is changed.

As illustrated in FIG. 32, the client may start the service search procedure in order to search the service of the server (S32010).

After the initiation of the service search procedure, the client may recognize whether the service of the server is changed through whether the service definition of the server is changed (S32020).

For example, when the service definition of the server is defined as illustrated in FIG. 29(b), the client may recognize whether the service is changed through the modified field of the service definition.

That is, when the value of the modified field is changed, the client may recognize that the service of the server is changed.

When the service definition is changed, the client may perform step S33010 of FIG. 33 in order to determine whether the include definition is changed (S32030).

When the service definition is not changed, the client determines that a current service is not changed and determines whether a service definition representing another service exists (S32040).

When another service definition exists, the client may perform step S32020 again in order to check whether to change another service definition.

However, when another service definition does not exist any longer, the client determines that another service does not exist in the server any longer and terminates the service search procedure.

FIG. 33 illustrates a method for searching whether the include definition representing the included service of the server is changed.

As illustrated in FIG. 33, when the client determines that the service definition is changed in FIG. 32, the client determines whether the include definition is changed (S33010).

For example, when the include definition of the server is defined as illustrated in FIG. 30(b), the client may recognize whether the included service is changed through the modified field of the include definition.

That is, when the value of the modified field is changed, the client may recognize that the included service of the server is changed.

When the include definition is changed, the client may perform step S34010 of FIG. 34 in order to check whether the characteristic value of the service is changed (S33020).

When the include definition is not changed, the client determines that a current included service is not changed and determines whether another included definition representing another included service exists (S33030).

When another include definition exists, the client may perform step S33010 again in order to check whether another include definition is changed.

However, when another include definition does not exist any longer, the client determines that another included service does not exist in the server any longer and performs step S32040 of FIG. 32 in order to check whether another service definition exists (S33040).

FIG. 34 illustrates a method for searching whether the characteristic definition representing the value of a characteristic related to a specific service of the server is changed.

As illustrated in FIG. 34, when the client determines that the include definition is changed in FIG. 33, the client determines whether the characteristic definition is changed in order to check the value of the characteristic related to the service is changed (S34010).

For example, when the characteristic definition of the server is defined as illustrated in FIG. 31(b), the client may recognize whether the value of the characteristic related to the specific service is changed through the modified field of the characteristic definition.

That is, when the value of the modified field is changed, the client may recognize that the value of the characteristic related to the specific service is changed.

When the characteristic definition is changed, the client may obtain the changed value of the characteristic by performing the service and the read procedure (S34020).

For example, the client may transmit a read request message for requesting the changed value of the characteristic to the server and the server may transmit to the client a read response message including the changed value of the characteristic in response thereto.

When the characteristic definition is not changed or the client obtains the changed value of the characteristic from the server, the client determines whether the characteristic definition representing another characteristic related to the specific service exists (S34030).

When another characteristic definition exists, the client may perform step S34010 again in order to check whether another characteristic definition is changed.

However, when another characteristic definition does not exist any longer, the client determines that the characteristic related to the specific service does not exist in the server any longer and performs step S33030 of FIG. 33 in order to check whether another include definition exists (S34040).

Through such a method, the client may recognize whether the service of the server and the data related to the service are changed and obtain the changed service and data.

FIGS. 35 to 37 are diagrams illustrating one example of function information for enhancing compatibility between devices according to the present invention.

Referring to FIGS. 35 to 37, the client and the server exchange information related to functions which may be provided to each other, thereby enhancing compatibility.

Specifically, the client may perform Discover All Primary Services, which is a procedure for searching for all services, and Discover Primary Service by Service, which is a procedure for discovering all services and Discover Primary Service by Service UUID which is a procedure for discovering the Primary Service through the UUID of the service in order to discover the services of the server.

However, in a profile for performing such a discovery procedure, the client may not recognize what function may be supported by a real server under a conditional condition.

Therefore, a compatibility problem may occur between the client and the server and due to the compatibility problem, the client requests a function not implemented in the server and then re-supports the function, and as a result, a time delay may occur.

In addition, the compatibility problem may occur because the Bluetooth does not recognize whether the other device supports various procedures implemented for each service.

Accordingly, the client and the server defines mutually supported functions as at least one of ATT feature information and GATT feature information, and transmit defined function information to the other party, thereby enhancing the compatibility.

For example, the client and the server may respectively define functions supported thereby as at least one of the ATT feature information or the GATT feature information as illustrated in FIG. 35.

In this case, in FIG. 35, the ATT Feature may be provided in an ATT PDU form and the GATT Feature may be provided in a GAT Procedure form.

In the ATT Feature and GATT Feature, each bit may represent whether each of the client and the server supports a specific function.

For example, when the value of a specific bit in the ATT Feature and the GATT Feature is '0', the bit value may represent that the server or the client doe snot support the function represented by the specific bit and when the value of the specific bit is '1', the bit value may represent that the server or the client supports the function represented by the specific bit.

FIG. 36 is a diagram illustrating one example of a function represented by each bit of the ATT Feature and FIG. 37 is a diagram illustrating one example of a function represented by each bit of the GATT Feature.

The function represented by each bit in FIGS. 36 and 37 is just one example and the function represented by each bit may be changed.

Figure 38:
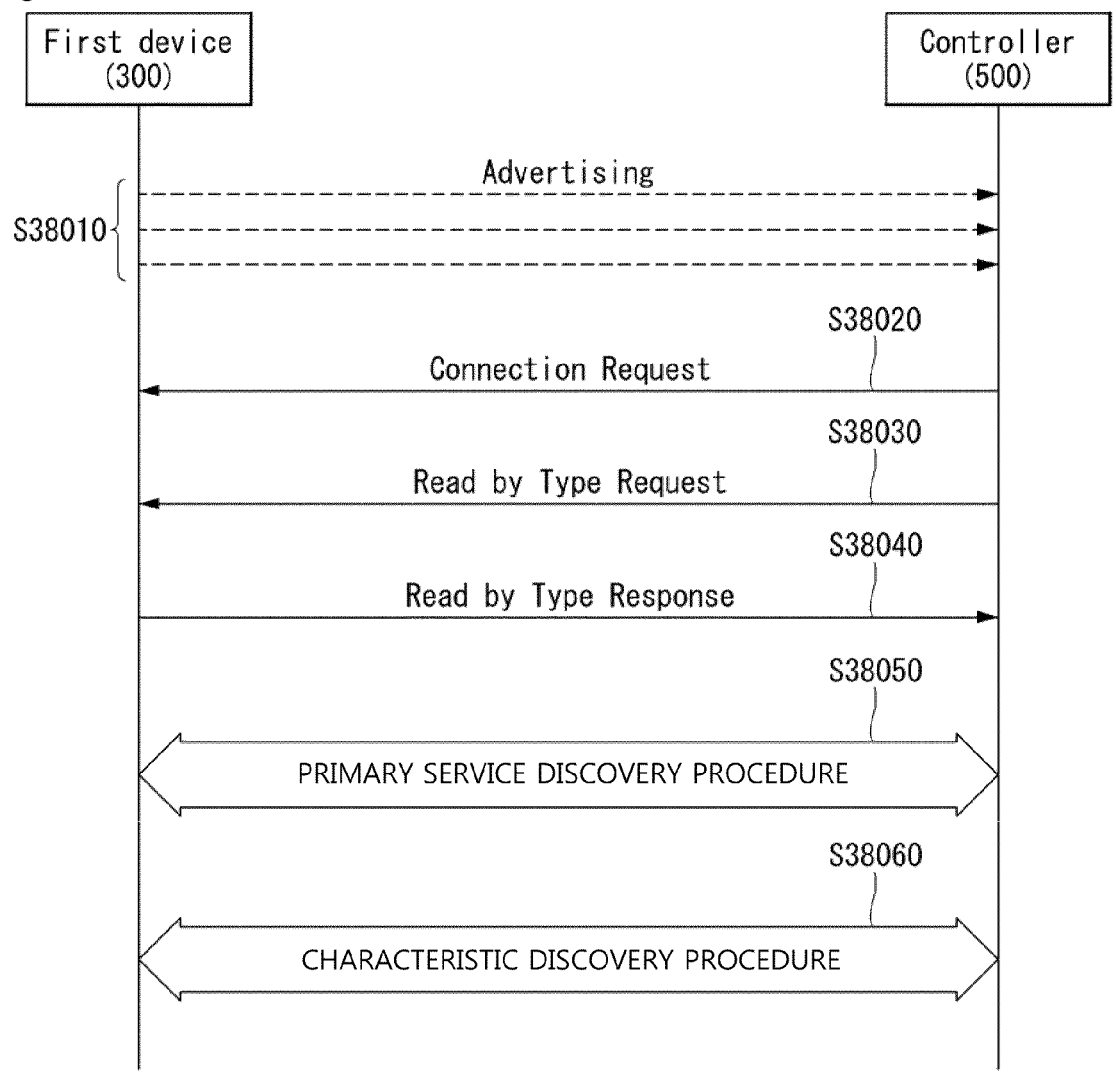
FIGS. 38 and 39 are flowcharts illustrating one example of a method for enhancing compatibility between devices according to the present invention.
Figure 39:
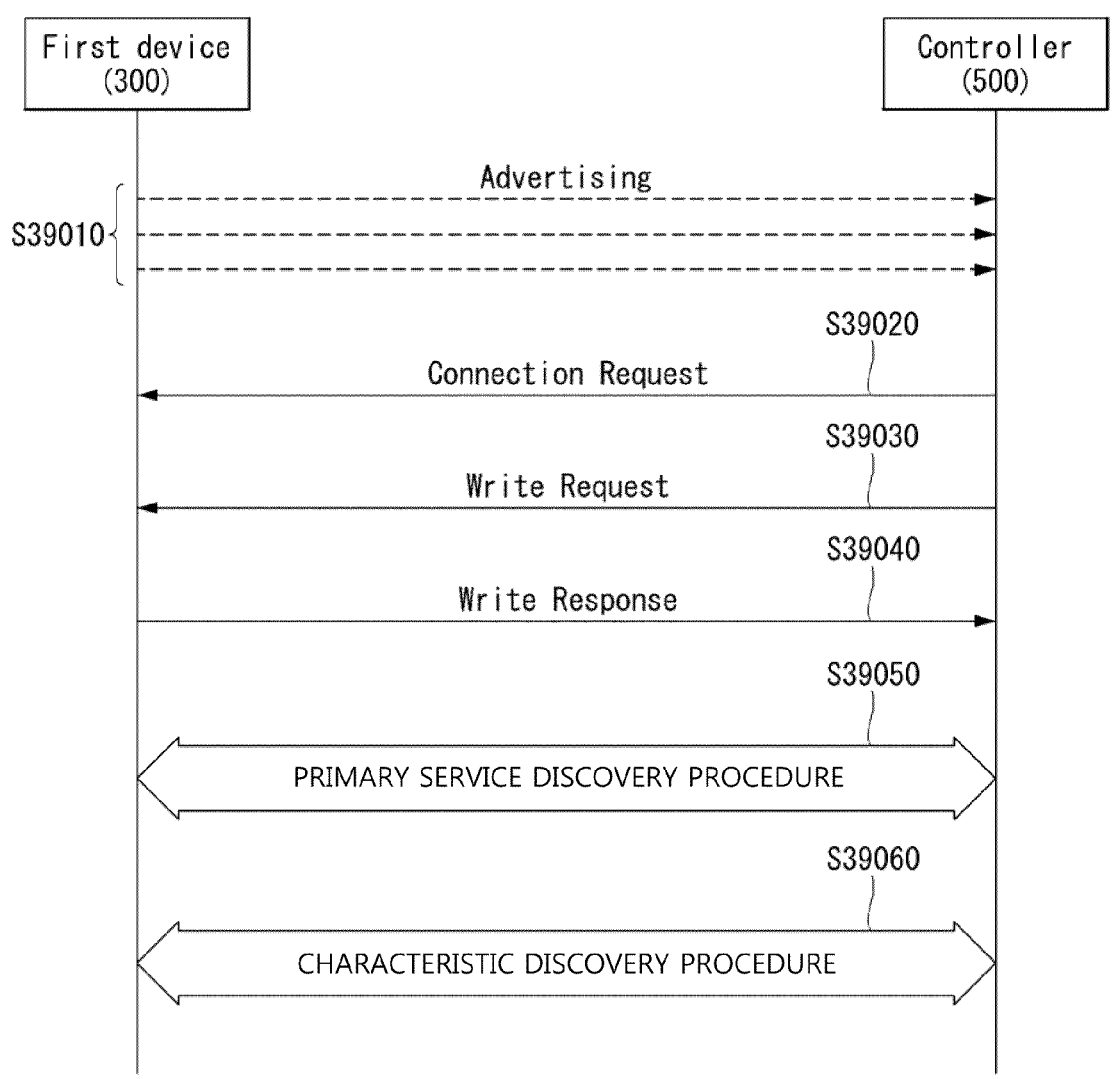

FIGS. 38 to 39 are flowcharts illustrating one example of a method for enhancing compatibility between devices according to the present invention.

FIG. 38 illustrates one example of a method for recognizing a function implemented in the other device through the ready procedure by the server and the client.

Referring to FIG. 38, when a GATT connection is initially by defining the GATT Feature representing a supportable function described in FIGS. 34 and 35 as a specific characteristic, the server and the client may recognize the function supported by the other device by reading the value of the specific characteristic.

First, since steps S38010 and S38020 are the same as steps S14010 and S14020 of FIG. 14, a description thereof will be omitted.

The controller 500 that forms the GATT connection with the first device 300 transmits Read by type Request message for requesting the value of the GATT Feature characteristic to the first device 300 in order to recognize the function implemented in the first device 300 (S38030).

In this case, Read by type Request message may include UUID for requesting the value of the GATT Feature characteristic.

When the controller knows a handle value of the GATT Feature characteristic, the controller may request the value of the GATT Feature characteristic through Read Request message instead of the Read by type Request message.

In this case, a fixed handle value may be required in order to request the value of the GATT Feature characteristic through the Read Request message without performing a Characteristic Discovery procedure.

The Read by Type Request message or the Read Request message may include at least one of the GATT Feature or the ATT Feature representing the function implemented in the controller 500 illustrated in FIGS. 35 to 37.

The first device 300 transmits to the controller 500 the Read by type Response message including the value of the GATT Feature characteristic in response to the Read by type Request message (S38040).

That is, the first device 300 may provide to the controller 500 the length and the data value of the attribute having the UUID included in the Read by type Request message.

Thereafter, the controller 500 may discover the primary service of the server by performing a primary service discovery procedure based on the function implemented in the first device 300 recognized through the value of the GATT Feature characteristic (S38050).

That is, the controller 500 may request a primary service list implemented in the first device 300 through the primary service discovery procedure and the first device 300 may transmit the primary service list to the controller 500.

The controller 500 that discovers the primary service of the first device 300 through the primary service discovery procedure may perform the characteristic discovery procedure in order to discover characteristics related to the discovered services (S38060).

That is, the controller 500 may request characteristic information related to the service of the first device 300 searched through the characteristic discovery procedure and the first device 300 may transmit specific information to the controller 500.

FIG. 39 illustrates one example of a method for recognizing a function implemented in the other device through a write procedure by the server and the client.

Referring to FIG. 39, when the GATT connection is initially by defining the GATT Feature representing the supportable function described in FIGS. 34 and 35 as the specific characteristic, the server and the client may recognize the function supported by the other device by writing the value of the specific characteristic.

First, since steps S39010 and S39020 are the same as steps S14010 and S14020 of FIG. 14, a description thereof will be omitted.

The controller 500 that forms the GATT connection with the first device 300 transmits Write request message for requesting writing of the GATT Feature characteristic to the first device 300 (S39030).

In this case, the write request message may include function information (GATT Feature in FIG. 35) representing the function implemented in the controller 500 and the first device writes function information included in the Write request message in the GATT Feature characteristic to recognize the function implemented in the controller.

The controller 500 may perform the Characteristic Discovery procedure in advance or require the fixed handle value in order to request writing in the GATT Feature characteristic.

The first device 300 writes the function information in the GATT Feature characteristic and transmits to the controller 500 the Write Response message in response to the Write Request message (S39040).

However, when the first device 300 fails in writing the function information in the GATT Feature characteristic, the first device 300 may transmit to the controller 500 an error message representing the failure in writing.

The Write response message may include the function information (GATT feature of FIG. 35) representing the function supported by the first device 300 and the controller 500 may recognize the function implemented in the first device 300 through the function information included in the Write response message.

Thereafter, since steps S39050 and S39060 are the same as steps S38050 and S38060 of FIG. 38, a description thereof will be omitted.

Figure 40:
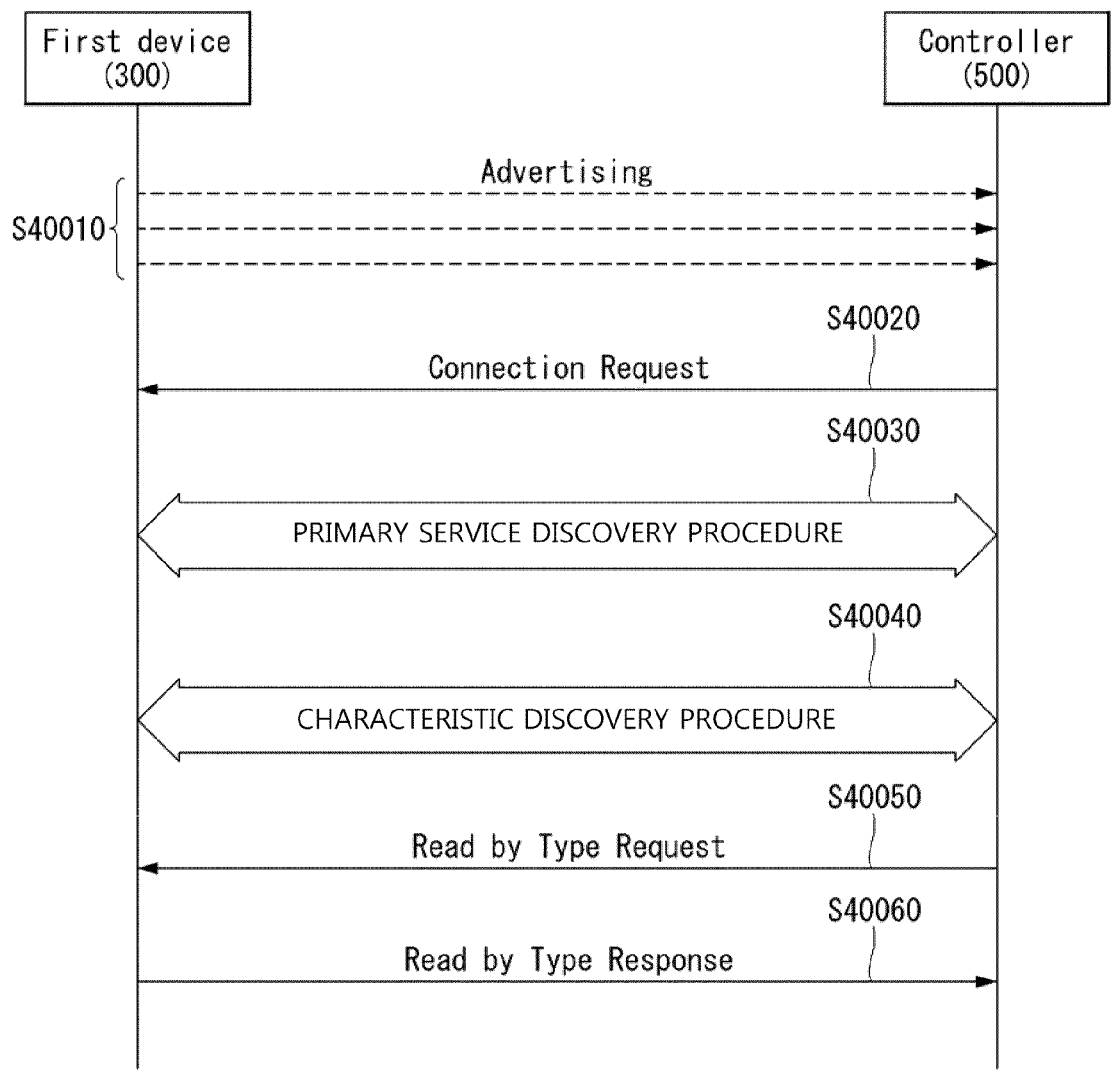
FIGS. 40 and 41 are flowcharts illustrating another example of a method for enhancing compatibility between devices according to the present invention.
Figure 41:
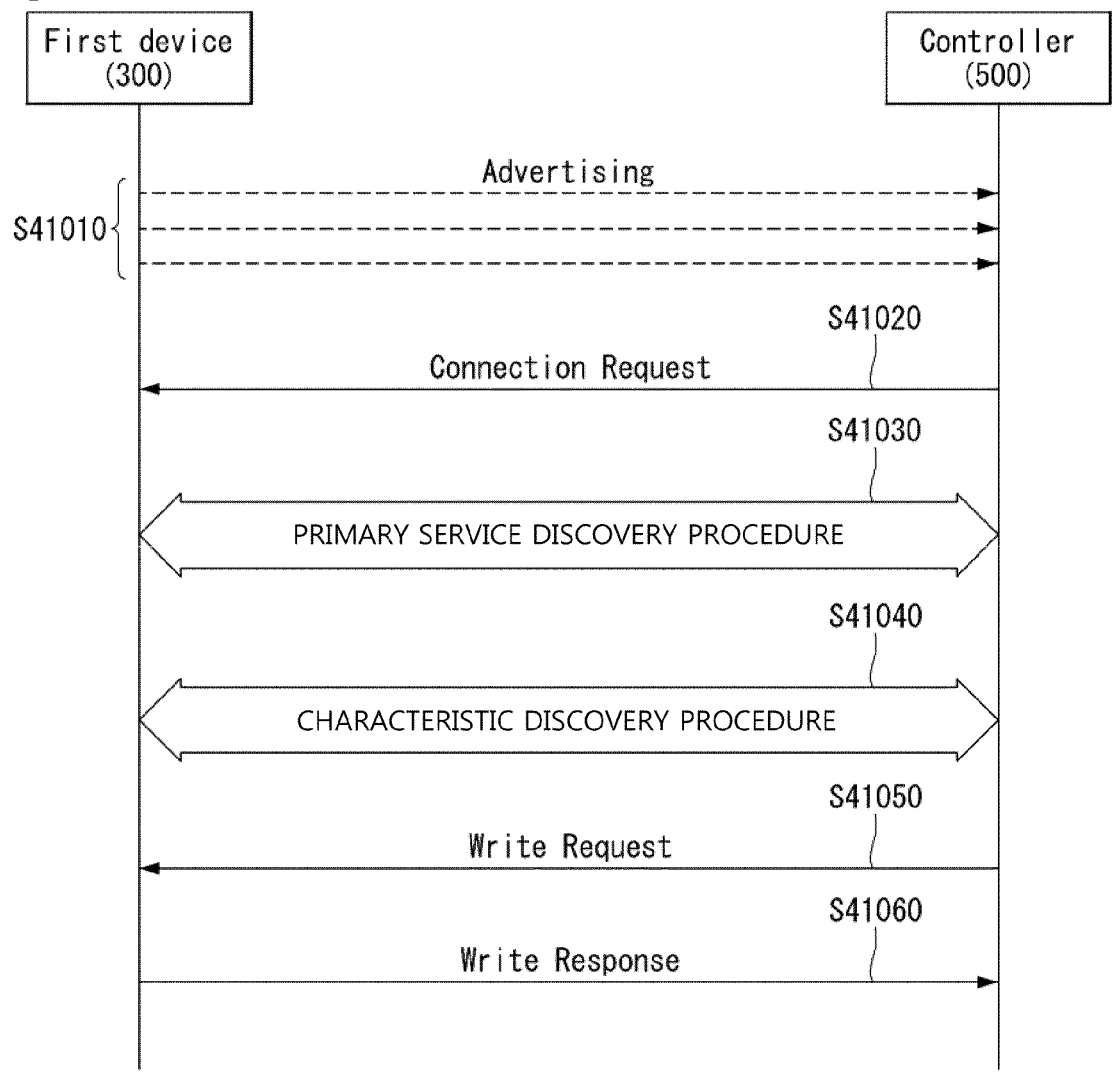

FIGS. 40 and 41 are flowcharts illustrating another example of a method for enhancing compatibility between devices according to the present invention.

Referring to FIGS. 40 and 41, when the GATT connection is initially formed by defining the GATT Feature representing the supportable function described in FIGS. 34 and 35 as the specific characteristic, the server and the client may discover the GATT Feature characteristic through the service and characteristic discovery procedures and the client may recognize a function which may be used in the specific service implemented in the server by requesting the value of the GATT Feature characteristic of the server.

FIG. 40 illustrates one example of a method for recognizing a function implemented in the server by obtaining the discovered characteristic value of the server through the read procedure by the client.

First, since steps S40010 and S40020 are the same as steps S14010 and S14020 of FIG. 14, a description thereof will be omitted.

The controller 500 that forms the GATT connection with the first device 300 may discover the Primary Service of the server by performing the Primary Service discovery procedure (S40030).

That is, the controller 500 may request a primary service list implemented in the first device 300 through the primary service discovery procedure and the first device 300 may transmit the primary service list to the controller 500.

The controller 500 that discovers the primary service of the first device 300 through the primary service discovery procedure may perform the characteristic discovery procedure in order to discover the characteristics related to the discovered services (S40040).

That is, the controller 500 may request characteristic information related to the service of the first device 300 searched through the characteristic discovery procedure and the first device 300 may transmit specific information to the controller 500.

In this case, the controller 500 may discover the GATT Feature characteristic which is the characteristic representing the function implemented for the specific service in the first device through the discovery procedure.

The controller 500 that discovers the characteristic transmit to the first device 300 the Read by type Request message for requesting the value of the GATT Feature characteristic in order to recognize the function implemented in the first device 300 (S40050).

In this case, Read by type Request message may include UUID for requesting the value of the GATT Feature characteristic.

When the controller knows a handle value of the GATT Feature characteristic, the controller may request the value of the GATT Feature characteristic through Read Request message instead of the Read by type Request message.

In this case, a fixed handle value may be required in order to request the value of the GATT Feature characteristic through the Read Request message without performing the Characteristic Discovery procedure.

The Read by Type Request message or the Read Request message may include at least one of the GATT Feature or the ATT Feature representing the function implemented in the controller illustrated in FIGS. 35 to 37.

The first device 300 transmits to the controller 500 the Read by type Response message including the value of the GATT Feature characteristic in response to the Read by type Request message (S40060).

That is, the first device 300 may provide to the controller 500 the length and the data value of the attribute having the UUID included in the Read by type Request message.

Thereafter, the controller 500 and the first device 300 may provide a specific service through the recognized functions.

FIG. 41 illustrates one example of a method for recognizing a function implemented in the other device through the write procedure of the discovered characteristic value of the server by the server and the client.

First, since steps S4101 to S41040 are the same as steps S40010 to S40040 of FIG. 40, a description thereof will be omitted.

The controller 500 that discovers the GATT Feature characteristic transmits to the first device 300 the Write request message for requesting writing of the GATT Feature characteristic (S41050).

In this case, the write request message may include the function information (GATT Feature in FIG. 35) representing the function implemented in the controller 500 and the first device writes the function information included in the Write request message in the GATT Feature characteristic to recognize the function implemented in the controller 500.

The controller 500 may perform the Characteristic Discovery procedure in advance or require the fixed handle value in order to request writing in the GATT Feature characteristic.

The first device 300 writes the function information in the GATT Feature characteristic and transmits to the controller 500 the Write Response message in response to the Write Request message (S41060).

However, when the first device 300 fails in writing the function information in the GATT Feature characteristic, the first device 300 may transmit to the controller 500 an error message representing the failure in writing.

The Write response message may include the function information (GATT feature of FIG. 35) representing the function supported by the first device 300 and the controller 500 may recognize the function implemented in the first device 300 through the function information included in the Write response message.

Figure 42:
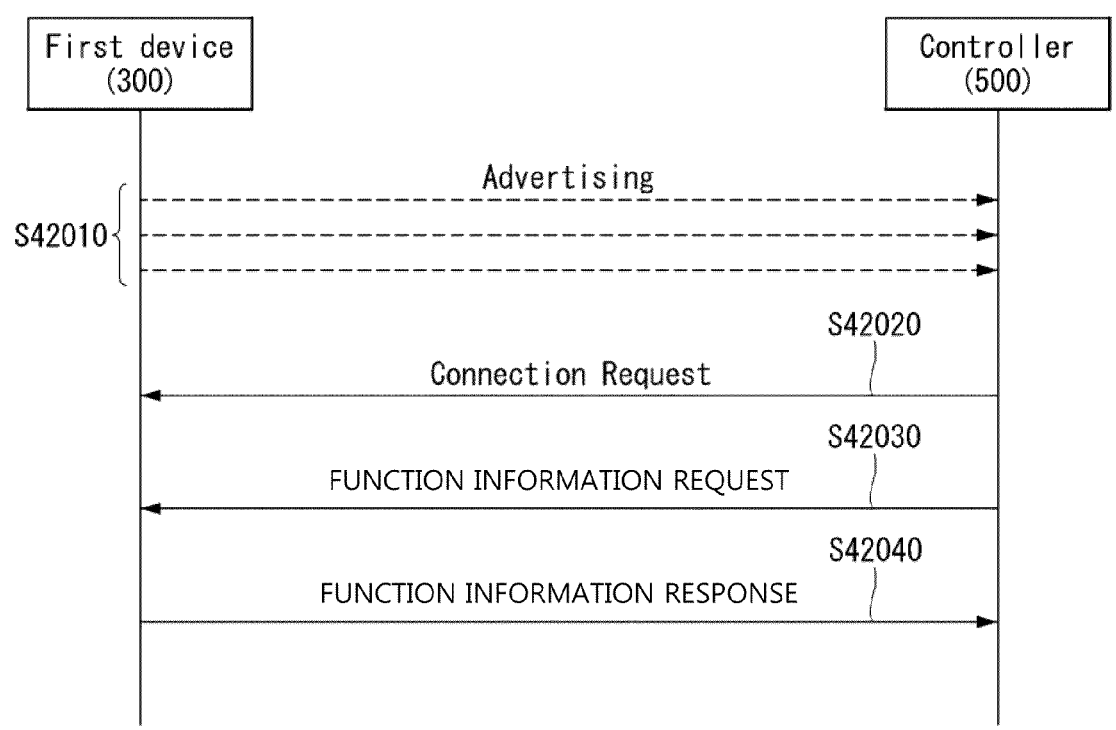
FIG. 42 is a flowchart illustrating yet another example of a method for enhancing compatibility between devices according to the present invention.

FIG. 42 is a flowchart illustrating yet another example of a method for enhancing compatibility between devices according to the present invention.

Referring to FIG. 42, the server and the client exchange the value of the GATT Feature representing the supportable functions described in FIGS. 34 and 35 to recognize the function implemented in the other device.

First, since steps S42010 and S42020 are the same as steps S14010 and S14020 of FIG. 14, a description thereof will be omitted.

The controller 500 that forms the GATT connection with the first device 300 transmits to a function information request message in order to request the value of the GATT Feature which is the function information representing the function implemented in the server (S42030).

In this case, specific ATT opcode may be defined in order to request the value of the GATT Feature through the function information request message.

That is, the controller 500 transmits to the first device 300 the function information request message including the specific ATT opcode instructing transmission of the value of the GATT Feature to obtain the value of the GATT Feature of the first device 300.

The function information request message may include at least one of the GATT Feature or the ATT Feature representing the function implemented in the controller 500 described in FIGS. 35 to 37.

The first device 300 may recognize the function supported by the controller 500 through the data value of the GATT Feature or the data value of the ATT Feature of the controller 500 included in the function information request message.

The first device 300 transmits to the controller 500 a function information response message including the value of the GATT Feature of the first device in response to the function information request message (S42040).

In this case, the specific ATT opcode may be defined in order to transmit the value of the GATT Feature through the function information response message.

That is, the first device 300 may transmit to the first device 300 the function information response message including the specific ATT opcode in order to announce to the controller 500 that the value of the GATT Feature is transmitted.

Figure 43:
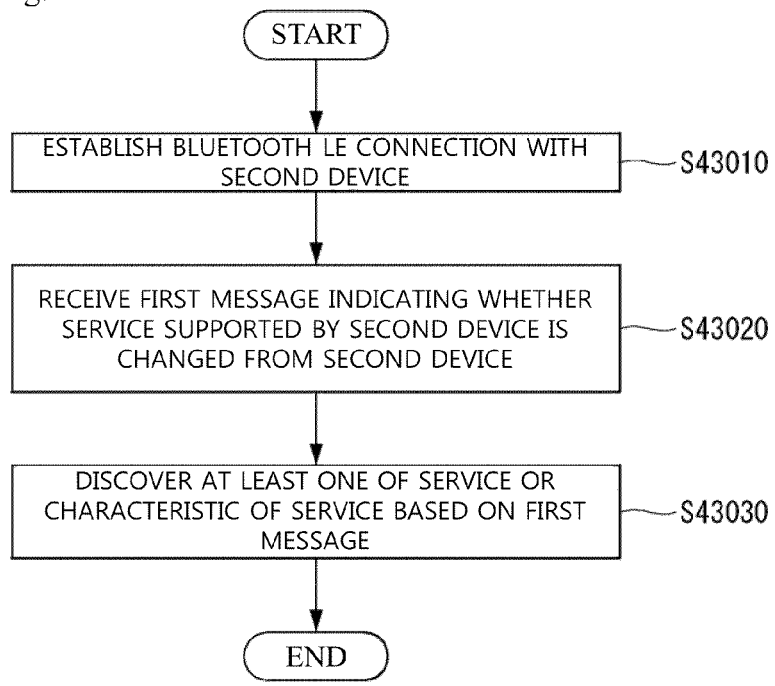
FIG. 43 is a diagram illustrating one example of a method for recognizing whether services and characteristics are changed according to the present invention.

FIG. 43 is a diagram illustrating one example of a method for recognizing whether services and characteristics are changed according to the present invention.

Specifically, the first device forms a Bluetooth LE connection with the second device through the method described in FIG. 14 (S43010).

The first device that forms the GATT connection with the second device through the Bluetooth LE connection receives from the second device a first message indicating whether the service supported by the second device is changed (S43020).

In this case, the first message may be a read response message or an instruction message including the characteristic value of the Changed information described in FIG. 27.

Thereafter, the first device discovers at least one of the service or the characteristic of the service based on the first message (S43030).

For example, the first device may recognize whether the service and the characteristic of the second device are changed through the methods described in FIGS. 26 to 34 and discover the changed service and characteristic.

In this case, as described in FIGS. 26 to 34, when the service of the second device is not changed and only the characteristic value of the specific service is changed, the first device may read the changed characteristic value by discovering only the changed characteristic without discovering all devices of the second device again.

The present invention proposed in this specification is described based on Bluetooth LE, but the present invention may be applied even to Bluetooth BR/EDR.

Furthermore, although the drawings have been described for the sake of convenience of explanation, it is also possible to design a new embodiment to be implemented by merging the embodiments described in each drawing. It is also within the scope of the present invention to design a computer-readable recording medium in which a program for executing the previously described embodiments is recorded according to the needs of those skilled in the art.

Configurations and methods of the described embodiments may not be limitedly applied to the method for discovering the service and the characteristic according to this specification, but all or some of the respective embodiments may be selectively combined and configured so as to be variously modified.

Meanwhile, the direction based apparatus search method of this specification may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of this specification have been illustrated and described above, this specification is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

In addition, in this specification, both the invention of the object and the invention of the method are described and the description of both inventions may be supplemented as necessary.

INDUSTRIAL APPLICABILITY

Although the data transmission and reception method of the present invention has been described with reference to the example applied to the Bluetooth LE, the data transmissions and reception method of the present invention can be applied to various wireless communication systems in addition to the Bluetooth LE system.

The invention claimed is:

1. A method for searching, by a first device, a service in a wireless communication, the method comprising:
 forming a wireless communication connection with a second device;
 receiving, from the second device, a first message for indicating whether at least one service supported by the second device is changed; and
 searching for the at least one service and/or a characteristic value of the at least one service based on the first message,
 wherein the first message includes a first value related to a change of the at least one service supported by the second device and a second value related to a change of the characteristic value of the at least one service,
 wherein the searching includes:
 determining whether the at least one service is changed based on the first value,
 searching the changed at least one service, when the first value represents the change of the at least one service,
 determining whether the characteristic value is changed based on the second value, and
 searching the changed characteristic value, when the second value represents the change of the characteristic value.

2. The method of claim 1, wherein the first value is a first hash value representing the at least one service, and
 wherein the second value is a second hash value representing the characteristic value.

3. The method of claim 2, further comprising:
 determining whether the first hash value or the second hash value is changed,
 wherein when the first hash value is changed, the at least one service represented by the first hash value is searched, and
 wherein when the second hash value is changed, the at least one service represented by the second hash value is searched.

4. The method of claim 1, further comprising:
 searching a primary service supported by the second device,
 wherein the primary service is an independent service without being included in other services; and
 searching a characteristic value of the searched primary service.

5. The method of claim 1, further comprising:
 transmitting, to the second device, a read request message for requesting reading of a characteristic value of a first characteristic for compatibility with the second device; and
 receiving a read response message including a first characteristic value of the first characteristic in response to the read request message,
 wherein the first characteristic value represents at least one function supported by the second device.

6. The method of claim 5, wherein the read request message includes a second characteristic value of a second characteristic for compatibility with the first device, and
 wherein the second characteristic value represents at least one function supported by the first device.

7. The method of claim 1, further comprising:
 transmitting, to the second device, a write request message for requesting writing of a first characteristic value of a first characteristic for compatibility with the first device,
 wherein the first characteristic value represents at least one function supported by the first device; and
 receiving a write response message including a second characteristic value of a second characteristic for compatibility with the second device in response to the write request message,
 wherein the second characteristic value represents at least one function supported by the second device.

8. A first device for searching a service in a wireless communication, the first device comprising:
 a communication module which wirelessly or wiredly communicates with at least one external entity; and
 a processor functionally connected with the communication module,
 wherein the processor controls the communication module to
 establish a wireless communication connection with a second device, and
 receive, from the second device, a first message for indicating whether at least one service supported by the second device is changed,
 wherein the first message includes a first value related to a change of the at least one service supported by the second device and a second value related to a change of a characteristic value of the at least one service, and
 wherein the processor is configured to,
 determine whether the at least one service is changed based on the first value,
 search the changed at least one service, when the first value represents the change of the at least one service,
 determine whether a characteristic value of the at least one service is changed based on the second value, and
 search the changed characteristic value, when the second value represents the change of the characteristic value.

9. The first device of claim 8, wherein the first value is a first hash value representing the at least one service, and
wherein the second value is a second hash value representing the characteristic value.

10. The first device of claim 9, wherein the processor is configured to
determine whether the first hash value or the second hash value is changed,
when the first hash value is changed, search the at least one service represented by the first hash value, and
when the second hash value is changed, search the characteristic value represented by the second hash value.

11. The first device of claim 8, wherein the processor is configured to
search a primary service supported by the second device,
wherein the primary service is an independent service without being included in other service, and
search a characteristic value of the searched primary service.

12. The first device of claim 8, wherein the processor is configured to
transmit, to the second device, a read request message for requesting reading of a characteristic value of a first characteristic for compatibility with the second device, and
receive a read response message including a first characteristic value of the first characteristic in response to the read request message, and
wherein the first characteristic value represents at least one function supported by the second device.

13. The first device of claim 12, wherein the read request message includes a second characteristic value of a second characteristic for compatibility with the first device, and
wherein the second characteristic value represents at least one function supported by the first device.

14. The first device of claim 8, wherein the processor is configured to
transmit, to the second device, a write request message for requesting writing of a first characteristic value of a first characteristic for compatibility with the first device,
wherein the first characteristic value represents at least one function supported by the second device, and
receive a write response message including a second characteristic value of a second characteristic for compatibility with the second device in response to the write request message,
wherein the second characteristic value represents at least one function supported by the second device.

* * * * *